(12) United States Patent
Saito et al.

(10) Patent No.: US 6,256,863 B1
(45) Date of Patent: Jul. 10, 2001

(54) YOKE TYPE MAGNETORESISTANCE HEAD AND MANUFACTURING METHOD OF THE SAME

(75) Inventors: Kazuhiro Saito, Yokohama; Akiko Saito, Kawasaki; Hitoshi Iwasaki, Yokosuka; Akihiko Tsutai; Hiroaki Yoda, both of Kawasaki; Tadahiko Kobayashi, Yokohama; Yuichi Ohsawa, Tokyo; Masahi Sahashi; Yuzo Kamiguchi, both of Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 08/815,179

(22) Filed: Mar. 11, 1997

(30) Foreign Application Priority Data

Mar. 12, 1996 (JP) .................................................. 8-055226
Sep. 13, 1996 (JP) .................................................. 8-243066

(51) Int. Cl.$^7$ ........................................................ G11B 5/42
(52) U.S. Cl. ........................ 29/603.08; 148/108; 360/317
(58) Field of Search ................................. 360/113, 317, 360/318; 338/32 R; 324/252; 29/603.08; 148/108

(56) References Cited

U.S. PATENT DOCUMENTS

| | | | |
|---|---|---|---|
| 4,413,296 | * 11/1983 | Jeffers | 360/113 |
| 4,544,421 | * 10/1985 | Springer | 148/108 X |
| 4,644,430 | * 2/1987 | French | 360/113 |
| 4,954,920 | * 9/1990 | Yanada et al. | 360/113 |
| 5,214,840 | * 6/1993 | Imagawa et al. | 29/603.08 |
| 5,461,526 | * 10/1995 | Hamakawa et al. | 360/113 |
| 5,561,896 | * 10/1996 | Voegeli et al. | 29/603.08 |

FOREIGN PATENT DOCUMENTS

0031015 * 2/1984 (JP) ........................................ 148/108

* cited by examiner

Primary Examiner—Carl E. Hall
(74) Attorney, Agent, or Firm—Finnegan, Henderson, Farabow, Garrett, & Dunner, L.L.P.

(57) ABSTRACT

A magnetic yoke having a magnetic gap provided in the side of the surface facing the medium is disposed on the surface of a substrate. An MR film is disposed on the surface of the magnetic yoke substantially parallel to the substrate with a predetermined separation from the surface S facing the medium. At least both end portions of the MR film are magnetically coupled to the magnetic yoke. A pair of leads for supplying sensing current to the MR film have magnetic lead portions formed from the same magnetic layers as the magnetic yoke. The magnetic lead portions curb deterioration of MR head properties and yield reduction during formation of the leads. Furthermore, a bias magnetic field is applied to the magnetic yoke and the MR film at least during operation of the head. This bias magnetic field is for instance provided by a magnetic field induced by the electric current. Alternatively, a magnetic field induced by the electric current is applied while heat-processing the magnetic yoke. Magnetic anisotropy is induced to the magnetic yoke in a direction differing according to the position. This magnetic anisotropy curbs Barkhausen noise caused by the magnetic yoke.

7 Claims, 22 Drawing Sheets

YOKE TYPE MAGNETORESISTANCE HEAD AND MANUFACTURING METHOD OF THE SAME

BACKGROUND OF THE INVENTION

1. Field of the Invention

The present invention relates to a magnetoresistance head for use in a playback head of a magnetic record/playback device and similar devices and a manufacturing method of the same.

2. Description of the Related Art

While the development of-high density magnetic recording has progressed in recent years, and high density HDD systems such as for instance 800 Mb/inch$^2$ have become commercially practical, there are demands for even higher HDD recording density. A magnoresistance head (hereinafter MR head) in which an external magnetic field modifies the electric resistance of certain types of magnetic thin-film and magnetic multi-layered thin-film and the like, namely magnetoresistance (hereinafter MR), is regarded as a potential playback head for such high density recording systems.

FIG. 44 shows a configuration example of a general shield-type MR head as used conventionally. In the diagram, 1 is a substrate consisting of $Al_2O_3 \cdot TiC$ and the like. A lower side shield layer 3 consisting of soft magnetic film such as permalloy is disposed an the substrate 1 with an insulating lower layer 2 consisting of $Al_2O_3$ and the like in between. An MR film 5 is provided above the lower side shield layer 3 with a non-magnetic film 4 in between forming a playback magnetic gap, A pair of leads 6 are connected to both ends of the MR film 5 to form an MR element 7. An upper side shield layer 9 is disposed above the MR element via a non-magnetic film 8 forming a playback magnetic gap. The shield type MR head detects a signal magnetic field by passing a sensing current through the pair of leads 6 and measuring changes in the resistance accompanying changes in the average direction of magnetization.

However, the tracking width of a shield MR head of the type described above is defined by the width of the two leads 6. Consequently, in order to respond to an additional increase in recording density, the distance between the two leads 6 must be reduced, thereby further diminishing the region sensitive to the magnetization. The recording density of a shield MR head can therefore be increased only by a limited degree. Moreover, during the manufacturing of the leads 6, the conductive film which forms the leads 6 must be patterned in the shape of the leads. There is a great danger here in that part of the MR film 5 will suffer etching, resulting in a reduction in the properties of the MR film 5 or a reduction in the manufacturing yield.

Furthermore, since the MR film 5 makes direct contact with the polish and the like during depth setting, there has been the serious problem of MR film 5 corrosion during this process. Measures have been adopted to solve this problem, such as the provision of insulating protective film on the surfaces and the like of the MR head facing the medium. However, this method is not suitable for low magnetic head levitation which is indispensable for improving line recording density. Moreover, contact recording systems which are expected to become the prominent high density technology of the future have the disadvantage that the protective film may be destroyed due to abrasions on the surface facing the medium. When such abrasion reaches the MR film 5, the resulting fluctuations in depth direction width not only cause the output of the head to fluctuate, but lead to the additional danger that the MR film 5 itself may be destroyed due to abrasion. There is therefore a demand for measures to prevent abrasion on the MR film 5.

FIG. 45 shows an MR head known as a yoke type MR head which is conventionally used in order to avoid the problems of the shield MR head as described above, in which a magnetic yoke 10 lead a signal magnetic field to an MR element 7 disposed within the head. In this yoke type MR head, an MR element 7 is disposed on a soft magnetic layer 11 which forms part of the magnetic yoke 10 with a non-magnetic film 12 forming a magnetic gap provided in between. Furthermore, MR film 5 is arranged between soft magnetic materials 13 and 14 forming one portion of the magnetic yoke 10 which are provided respectively from the surface facing the medium so as to connect with the soft magnetic layer 11 inside the head.

In the conventional yoke type MR head described above, the leads 6 are disposed in exactly the same way as in the shield MR head. Therefore, head properties and yield are liable to deteriorate due to etching reaching the MR film 5. Furthermore, playback output is liable to fluctuate depending on the state of the connection between the position of the MR element 7 and the magnetic yoke 10, or as a result of alignment differences and such like between the MR film 5 and the soft magnetic materials 13 and 14 forming part of the magnetic yoke 10. It has consequently been difficult to manufacture MR heads having all the desirable properties with a high yield.

Alternatively, a configuration has been suggested in which a magnetic core 15 is provided on the substrate 1 in the lamination direction and an MR element 7 is disposed inside the magnetic care 15 as depicted in FIG. 46.

As before, however, the playback output of this configuration is low, since the magnetic permeability rate is the thickness direction of the film of the magnetic core 15 is virtually zero and the MR element 7 is moved back from the surface facing the medium only as far as the thickness of the film of the magnetic core 15. Furthermore, it is difficult to reduce costs when using a conventional yoke type MR head as described above since the manufacturing processes of both the magnetic yoke and the leads are complex.

Conventional yoke type MR heads have had the additional disadvantage that Barkhausen jumps in the magnetic yoke are liable to generate noise. In other words, in a case in which the direction of the magnetic path formed by the signal magnetic field is parallel to the axis of easy magnetization of the magnetic yoke, an abrupt magnetic reversal occurs when the signal magnetic field is reversed, thereby causing signal noise such as Barkhausen noise.

Positioning the axis of easy magnetization of the magnetic yoke at a right angle to the direction of the magnetic path is one accepted method of reducing such signal noise. When using a magnetic yoke having an indented portion such as the magnetic yoke 15 shown in FIG. 46 for instance, the aim is to induce magnetic anisotropy at a right angle to the direction of the magnetic path to every part of the indented portion of the magnetic yoke.

Formation of the film within a magnetic field and annealing (heat processing) in a Magnetic field are conventional methods of inducing magnetic anisotropy. An ordinary external coil is used as a means of applying the magnetic field in such magnetic field film formation and annealing in the magnetic field. However, since an external coil can only apply a magnetic field in one direction, it is not possible to apply an axis of easy magnetization at a right angle to the magnetic path direction to the whole of a magnetic yoke having an indented portion.

As explained above, when the distance between leads required for high density recording is reduced in a conventional shield MR head, the region sensitive to magnetic fields is lessened. This limits high density recording capability. A conventional MR head has the additional disadvantages that etching may reach the MR film during the manufacturing process of the leads, the MR film is liable to corrode, and abrasions on the MR film can lead not only to fluctuating head output but also destruction of the MR film itself.

Alternatively, a yoke type MR head is regarded as potentially capable of use in high density recording since a yoke type MR head avoids problems related to abrasion on MR elements when implementing low magnetic levitation record/playback or contact system record/playback. However, like the shield MR head, the conventional yoke type MR head has the drawback that head properties and yield are liable to deteriorate as a result of etching reaching the MR film during the leads are arranged. In addition, the complex manufacturing processes of the magnetic yoke and the leads and the like make it difficult to reduce costs.

Furthermore, a conventional yoke type MR head has the disadvantage that Barkhausen noise is liable to be generated when magnetic domains are created or a magnetization direction is reversed in the magnetic yoke. Barkhausen noise can be reduced by for instance controlling the magnetic anisotropy of the magnetic yoke. However, in conventional methods of inducing magnetic anisotropy, it has been extremely awkward to control the axis of easy magnetization of an entire magnetic yoke having an indented portion in order that the direction of the axis of easy magnetization is at a right angle to the magnetic path. In addition, a conventional yoke type MR head has the disadvantage that playback output is low and variable output is liable to occur.

SUMMARY OF THE INVENTION

It is therefore the object of the present invention to provide a yoke type MR head for which manufacturing processes of magnetic yoke and leads and the like can be simplified at reduced cost while eliminating deterioration of MR film properties or reduction of yield accompanying formation of the leads. Another object of the present invention is to provide a yoke type MR head in which Barkhausen noise caused by the magnetic yoke is curbed and both improved playback output and curbing of playback output fluctuation are achieved. A further object of the present invention is to provide a manufacturing method of a yoke type MR head wherein a yoke type MR head of the abovementioned type can be manufactured with high levels of reproducibility and efficiency.

A first magnetoresistance head of the present invention comprises a substrate, a magnetic yoke provided on the substrate, a magnetic gap provided in the side of the surface facing the medium of the magnetic yoke, a magnetoresistance film disposed in a position with a predetermined separation from the surface facing the medium, wherein at least both end portions of the magnetoresistance film are magnetically coupled to the magnetic yoke and a pair of leads for supplying a sensing current to the magnetoresistance film having a magnetic lead portion formed from the same magnetic layers as the magnetic yoke.

The first magnetoresistance head may preferably be disposed with the magnetoresistance film in a direction substantially parallel to the main surface of the substrate.

In a first magnetoresistance head of the present invention, at least one portion of a pair of leads for supplying a sensing current to the magnetoresistance film comprises the same magnetic layers as the magnetic yoke. A magnetic lead portion such as this renders the provision of leads directly contacting the magnetoresistance film unnecessary and consequently, deterioration of magnetoresistance film properties or reduction in yield accompanying formation of the leads and such like can be prevented. Furthermore, the simplified configuration of the magnetoresistance film portion enables reductions to be made in manufacturing time and manufacturing costs. In addition, sensitivity can be improved since the size of the magnetoresistance film is no longer limited by the leads.

In the first magnetoresistance head, the arrangement of the magnetoresistance film can be accurately controlled by arranging the magnetic yoke and the magnetoresistance film parallel to the substrate surface. As a result, the magnetoresistance film can for instance be precisely disposed in a position at the minimum distance back from the surface facing the medium. This is an effective measure against reduced playback output and, in addition, variation and the like in playback output can be reduced.

A second magnetoresistance head of the present invention comprises a substrate, a magnetic yoke disposed along the substrate surface the magnetic yoke having a plane surface substantially parallel to the substrate surface, a magnetic gap provided in the side of the surface facing the medium of the magnetic yoke, a magnetoresistance film disposed along the plane surface of the magnetic yoke with a predetermined separation from the surface facing the medium, wherein at least both end portions of the magnetoresistance film are magnetically coupled to the magnetic yoke and a pair of leads for supplying a sensing current to the magnetoresistance film, wherein a bias magnetic field is applied to the magnetic yoke and the magnetoresistance film at least during operation of the head.

The second magnetoresistance head is characterized in that electric current is supplied to the magnetic yoke during operation of the head and a magnetic field induced by this current is used to apply the bias magnetic field.

A third magnetoresistance head of the present invention comprises a substrate, a magnetic yoke disposed along the substrate surface, wherein the magnetic yoke has a plane surface substantially parallel to the substrate surface and magnetic anisotropy of a direction differing depending on the position in accordance with the shape thereof, a magnetic gap provided in the side of surface facing the medium of the magnetic yoke, a magnetoresistance film disposed along the plane surface of the magnetic yoke with a predetermined separation from the surface facing the medium, wherein at least both end portions of the magnetoresistance film are magnetically coupled to the magnetic yoke and a pair of leads for supplying a sensing current to the magnetoresistance film.

A magnetoresistance head manufacturing method of the present invention comprises a process of forming a magnetic yoke on a substrate, a process of at least passing an electric current through the magnetic yoke while performing heat processing thereto and inducing magnetic anisotropy of a direction differing depending on the position in accordance with the shape of the magnetic yoke and a process of forming a magnetoresistance film and a pair of leads for supplying current thereto on the magnetic yoke.

According to a magnetoresistance head in a second embodiment of the present invention, in addition to providing a magnetic yoke parallel to the substrate surface and a magnetoresistance film, a bias magnetic field is applied to the magnetic yoke and the magnetoresistance film at least during operation of the head. A bias magnetic field is applied for instance by means of a current-induced magnetic field created by passing an electric current through the magnetic yoke during operation of the head. Therefore, as well as avoiding reduction and variation and the like in playback output, magnetic domains of the magnetic yoke can be securely controlled. This magnetic domain control helps to improve linearity with respect to the input magnetic field of the magnetic yoke. Furthermore, the occurrence of Barkhausen noise and such like can be restricted.

According to a magnetoresistance head in a third embodiment of the present invention, magnetic anisotropy in a direction differing depending on the position is induced in accordance with the shape of the magnetic yoke. Such magnetic anisotropy can be induced by carrying out heat processing based on the manufacturing method of the present invention, in other words by flowing an electric current through the magnetic yoke to apply a current-induced magnetic field while performing heat processing. When an electric current is used for inducing the magnetic field, it is possible to induce magnetic anisotropy to a magnetic yoke having an indented portion in a direction differing depending on the position, since the magnetic field induced is applied in a direction perpendicular to the current. In other words, magnetic anisotropy can be induced substantially at right angles to the magnetic path throughout the entire magnetic yoke. Such magnetic anisotropy prevents a reversal of the magnetic yoke magnetization when the signal magnetic field reverses, making it possible to curb signal noise such as Barkhausen noise.

DESCRIPTION OF THE PREFERRED EMBODIMENTS

The preferred embodiments of the present invention will next be explained with reference to the diagrams.

Figure 1:
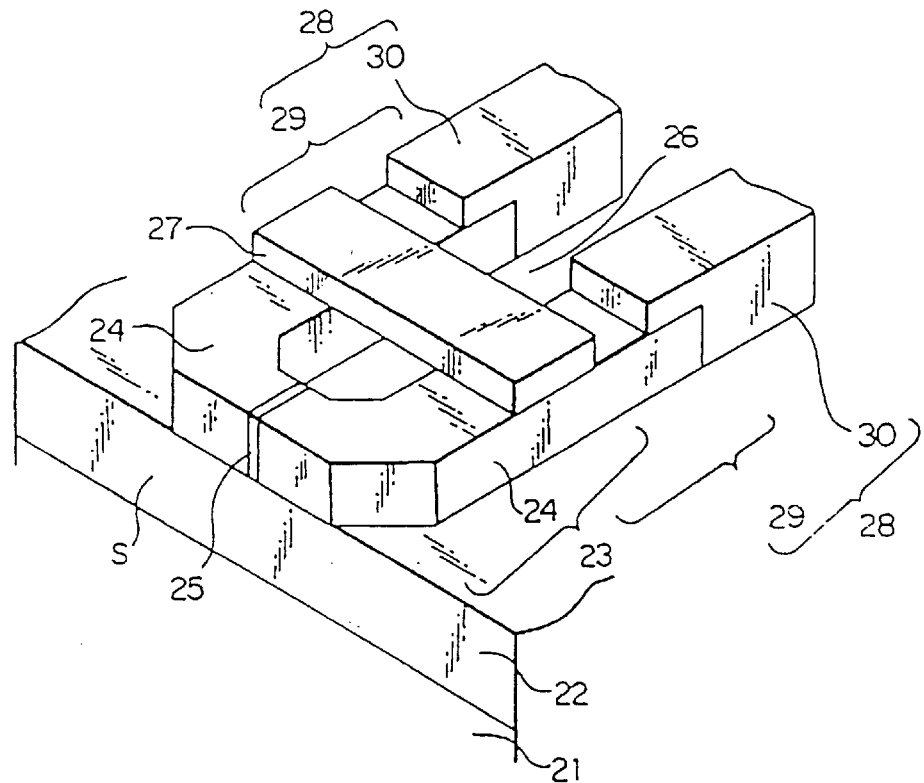
FIG. 1 is a diagonal overview of a general configuration of an embodiment of a first yoke type MR head of the present invention.

FIG. 1 is a diagonal overview of a general configuration of an embodiment of a first yoke type MR head of the present invention. In the diagram, 21 is a substrate consisting of $Al_2O_3$·TiC substrates and the like. An insulating layer 22 consisting of $Al_2O$, and the like is provided above the substrate 21 as a lower layer. A pair of magnetic layers (magnet core) 24 which chiefly form a magnetic yoke 23 are provided above the insulating lower layer 22. Soft magnetic materials such as for instance Ni-Fe alloy, Fe-Al-Si alloy, amorphous magnetic alloys such as Co-Zr-Nb and Co-B, FE-X-N alloy (X=at least 1 type of element selected from Ta, Zr, Ti, Cr and the like) are used as the magnetic layers 24.

The addition of favorable soft magnetic properties allows Co-type ferromagnetic substances such as Co-Ni alloy, Co-Fe alloy to be used effectively as the magnetic layers 24. These soft magnetic properties favorable to Co-type ferromagnetic substances can be obtained by for instance providing a lower layer formed from an amorphous soft magnetic layer or a crystalline substance soft magnetic layer or a laminated film consisting of these or such like and providing a Co-type ferromagnetic substance layer above this lower layer. In addition, crystalline particle size and the like of Co-type ferromagnetic substances can be controlled by adding not more than 30 at % of C, B, N, O and such like. It thus becomes possible to adjust the magnetic properties.

The configuration and alignment of the magnetic layers 24 formed from Fe, Co, Ni or alloys of these should preferably be bcc(110), fcc(111). As explained below, the same configuration and alignment is also preferable when forming a magnetic yoke from laminated film comprising ferromagnetic material layers and non-magnetic layers or from laminated film comprising anti-ferromagnetic material layers and ferromagnetic material layers and non-magnetic material layers.

The magnetic yoke 23 is formed by arranging the pair of magnetic layers 24 side-by-side on the surface of the substrate 21 so as to form a single plane surface parallel thereto. In other words, the magnetic yoke 23 has a plane surface substantially parallel to the substrate surface. The thickness of the magnetic yoke 23 is designed to be narrower than the width of the recording track. Consequently, the thickness of the magnetic layer 24 is set in accordance with the recording track width. Specifically, the thickness of the magnetic layer 24 should preferably be around 10–2000 nm and ideally around 100–500 nm.

A magnetic gap 25 is provided between the pair of magnetic layers 24 forming the magnetic yoke 23 on the side S of the surface facing the medium in a direction substantially perpendicular to the substrate surface. The magnetic gap 25 and the magnetic yoke 23 are arranged so that both they and a magnetic circuit formed from an MR film 27 to be explained below are substantially parallel to the substrate surface. The magnetic gap 25 is formed from a non-magnetic material having a predetermined thickness (gap length). In this embodiment, non-magnetic material such as $Al_2O_3$ is used.

A back gap 26 which is wider than the magnetic gap 25 is provided on the rear side of the magnetic gap 25. The portion corresponding to this back gap 26 can acceptably be flattened with a resist or the like as used in the manufacturing process of the pair of magnetic layers 24.

An MR film 27 is provided over the plane surface of the magnetic yoke 23 which is substantially parallel to the substrate surface, in other words on the plane surface substantially parallel to the magnetic flux (magnetic circuit of the magnetic yoke 23) passing within the magnetic yoke 23. The MR film 27 is positioned at a predetermined distance back from the side S of the surface facing the medium. In other words, the MR film 27 is positioned on the plane surface corresponding to the upper surface of the lamination direction of the pair of magnetic layers 24 so that the MR film 27 is magnetically coupled to both of the magnetic layers 24 across the back gap 26.

The longitudinal direction of the MR film 27 is substantially parallel to the direction of a signal magnetic field lead by the magnetic yoke 23. The signal magnetic field fed to the magnetic yoke 23 from the recording medium through the magnetic gap 25 is led along the magnetic yoke 23 to the MR film 27. In other words, the magnetic yoke 23 and the MR film 27 form a ring-shaped magnetic core through the magnetic gap 25.

After consideration of the abrasion or possible shorts or such like caused by contact with the recording medium, the depth direction of the MR film 27 should preferably be close to the surface S facing the medium. The MR film 27 can be precisely disposed close to the surface S facing the medium once the MR film 27 has been moved back the minimum distance therefrom. In other words, the MR film 27 can be precisely disposed in a position close to the surface S facing the medium without losing any of the advantages of the yoke type MR head. The distance of the MR film 27 from the surface S facing the medium largely depends on the amount of signal magnetic field fed in, but a distance of around 0.2~10 $\mu$m is preferable and 0.2~3 $\mu$m is particularly desirable.

Anistropic magnetoresistance film (AMR film) or giant magnetoresistance film (GMR film) with laminated film consisting of magnetic layers and non-magnetic layers can for instance be used as the MR film 27. AMR film may for instance consist of an $Ni_{40}Fe_{20}$ alloy, the electric resistance of which varies depending on current direction and on the angle formed by the magnetization moment of the magnetic layer. A sandwich film comprising ferromagnetic layer/non-magnetic layer/ferromagnetic layer, the electric resistance of which varies depending on the angle formed by the magnetization of each ferromagnetic layer, namely a spin-valve film, can for instance be used as the GMR film, For instance, a laminated film having a configuration such as $Co_{90}Fe_{10}/Cu/Co_{90}Fe_{10}$ could serve as the spin-valve film. A non-natural lattice film having a laminated film consisting of multiple ferromagnetic layers and non-magnetic layers which exhibits giant magnetoresistance is also an effective GMR film.

The pair of leads 28 for supplying sensing current to the MR film 27 comprise magnetic lead portions 29 and low-resistant lead portions 30 formed from for instance Cu. The magnetic lead portions 29 comprise the extending portions (rear portions) of the pair of magnetic layers 24 forming the magnetic yoke 23 when the magnetic layers 24 face away from the surface S facing the medium. Low-resistant lead portions 30 are connected to each of these magnetic lead portions 29.

The leads 28 thus have magnetic lead portions 29 consisting of the same magnetic layers 24 as those forming the magnetic yoke 23. In other words, the portion of the pair of magnetic layers 24 from the surface S facing the medium housing the magnetic gap 25 to the portion disposed on the lower side of the MR film 27 forms the magnetic yoke 23 and the portion from the lower side of the MR film 27 to the portion connected to the low-resistant lead portions 30 forms the magnetic lead portions 29. A sensing current is supplied to the MR film 27 from the low-resistant lead portions 30 through the magnetic lead portions 29.

In the configuration of the yoke type MR head according to the embodiment described above, contact between the MR film 27 and the Cu layer portion hitherto used as the single lead in a conventional MR head is avoided by using magnetic lead portions 29 and low-resistant lead portions 30 consisting of Cu and such like to form the leads 28 for supplying a sensing current to the MR film 27. As a result, the low-resistant lead portions 30 consisting of Cu and such like can be easily created and reduced yield and deterioration in properties of the MR film 27 can be prevented.

Figure 42:
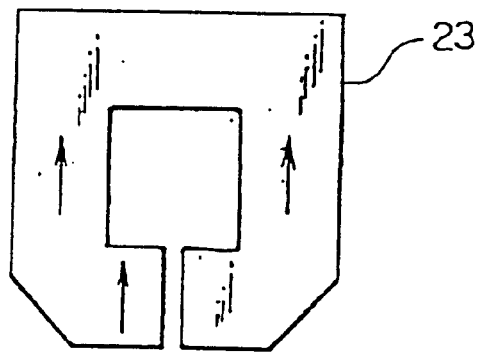
FIG. 42 is a diagram showing observation results of the magnetization direction in a magnetic yoke in a test of a comparative example.

Furthermore, this simplified configuration of the MR film 27 makes it possible to reduce manufacturing costs and such like. For instance, the manufacturing process of the MR film like, portion of the conventional example depicted in FIG. 42 is extremely complex. By contrast, in this embodiment no processing such as patterning is carried out since the MR film 27 portion is simply disposed on the magnetic layer 24. The manufacturing process is simpler and easier than previously provided manufacturing processes. In addition, sensitivity can be increased because the size of the MR film 27 is no longer limited by the leads.

Furthermore, the MR film 27 can be provided at any position above the magnetic layer 24. For instance, the MR film 27 can even be disposed with precision at a minimum distance back from the minimum surface S facing the medium (i.e. a position proximate to the surface S facing the medium). Therefore, a large amount of signal fluxe can be led to the MR film 27 and reduced output, which was one of the disadvantages of the conventional yoke type MR head, can be avoided. Since the MR film 27 is disposed above the plane surface of the magnetic yoke 23, the amount of overlap between the MR film 27 and the pair of magnetic layers 24 forming the magnetic yoke 23 can be set irrespective of the distance of the MR film 27 from the surface S facing the medium. It is therefore possible to reduce variation in playback output.

When the width of the MR film 27 is small, a large number of magnetic fluxe (signal magnetic fields) per width unit can be led to the MR film 27, thereby obtaining high-quality playback output. The MR film 27 should preferably be magnetized from a state parallel to the width direction of the MR film 27 to the longitudinal direction (direction of magnetic flux generated by magnetic circuit). However, when an MR film consisting only of magnetic film is used, magnetization causes curling on the edges of the width direction and the magnetization is consequently less likely to move parallel to the width direction when the width of the MR film is reduced.

In the case of a 3-layer laminated MR film in which a non-magnetic layer is disposed between a pair of ferromagnetic layers, the magnetization of the ferromagnetic layers generated by the signal flux can be moved from parallel to the width direction to the longitudinal direction by feeding the sensing current in a direction generally parallel to the direction of the magnetic flux, even if the width of the MR film is narrowed to around 3 $\mu$m. Consequently, when the width of the MR film 27 is narrowed, a larger amount of magnetic fluxe per unit of width can be led in a favorable changes in the magnetization direction of the MR film 27 can also be retained. In turn, playback output can be increased. If a spin-valve film is used as the 3-layered MR film here, the advantage of being able to move the magnetization of the MR film 27 from a position parallel with the width direction to the longitudinal direction can be utilized more effectively.

Figure 2:
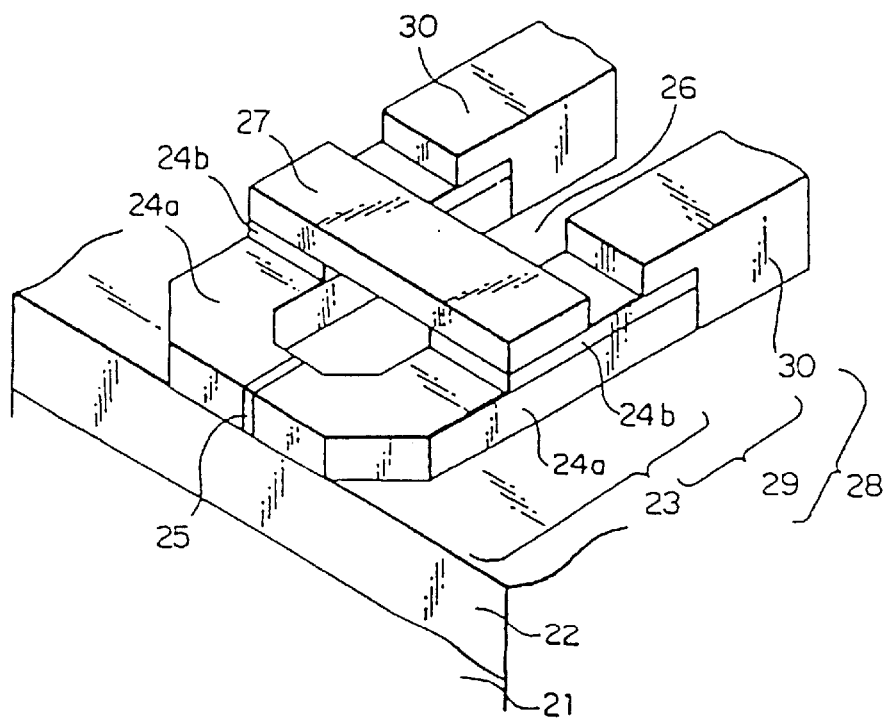
FIG. 2 is a diagonal overview of a modified example of the yoke type MR head shown in FIG. 1.

FIG. 2 shows a configuration of a modified example of the above-mentioned embodiment. In the yoke type MR head depicted in this diagram, the magnetic lead portions 29 consists of a first magnetic layer 24a and a low-resistance second magnetic layer 24b disposed above this first magnetic layer 24a. In other words, when the resistance value of the first magnetic layer 24a is $R_1$ and the resistance value of the second magnetic layer 24b is $R_2$, the relation between the resistance values of the two magnetic layers is $R_1 > R_2$. Specifically, the first magnetic layer 24a and second magnetic layer 24b could for instance be formed from a combination of a ferrite or permalloy-type magnetic substance and an amorphous magnetic alloy, or a combination of an amorphous magnetic alloy and a ferrite.

With the above configuration, shunt current to the first magnetic layer 24a can be curbed since the low-resistance second magnetic layer 24b largely serves as the magnetic lead portions 29. This increases the sensitivity of the MR film 27.

Various arrangements of magnetic layers can be used as the magnetic layers forming the magnetic yoke 23 and the magnetic lead portions 29, such as multi-layered film of 3 or more layers or film to which concentration distribution has been applied in the direction of the film formation by gradually adding additional elements when creating the magnetic layers, thereby continuously altering the resistance value.

A yoke type MR head according to another embodiment of a first magnetoresistance head of the present invention will next be explained with reference to FIG. 3.

Figure 3:
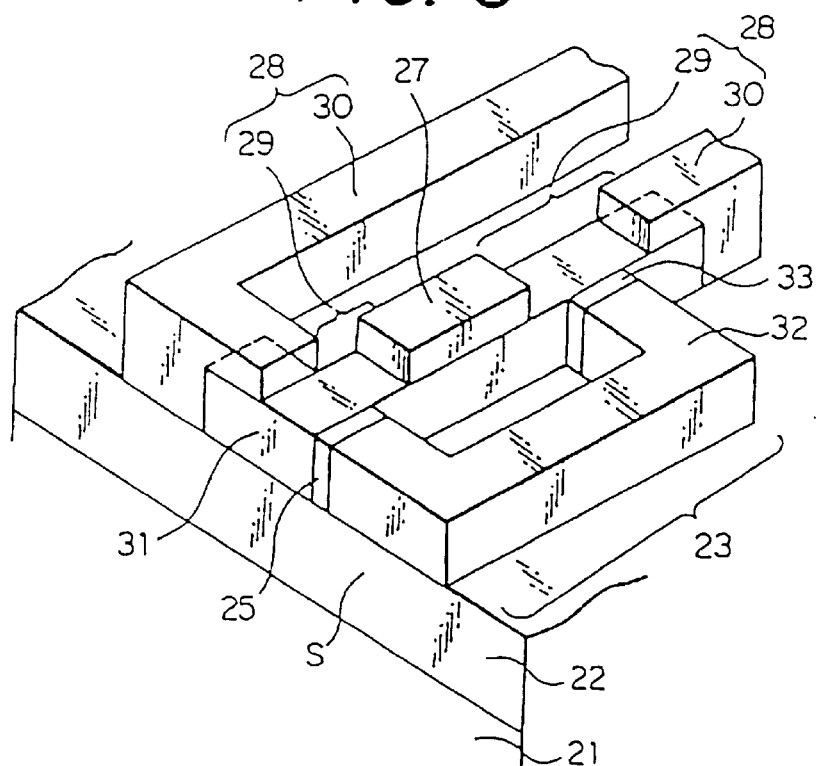
FIG. 3 is a diagonal overview of a general configuration of another embodiment of a first yoke type MR head of the present invention.

In the MR head shown in FIG. 3, first and second magnetic layers 31 and 32 forming a magnetic yoke 23 and magnetic lead portions 29 are arranged on an $Al_2O_3 \cdot TiC$ substrate 21 having an insulating lower layer 22 as in the embodiment described above. In the present embodiment, first and second magnetic layers 31 and 32 are arranged facing each other across a magnetic gap 25 provided on the surface S facing the medium and a magnetic gap 33 provided on the rear portion so as to form a closed magnetic circuit. The portions forming this closed magnetic circuit comprise the magnetic yoke 23. Magnetic gap 33 is manufactured by the same process as magnetic gap 25.

A MR film 27 is provided on the first magnetic layer 31 with the longitudinal direction of the MR film 27 facing away from the surface S facing the medium. The end portions of the first magnetic layer 31 upon which the MR film 27 is provided are magnetic lead portions 29. Low-resistant lead portions 30 consisting of Cu and the like are connected to these magnetic lead portions 29 as in the embodiment described above. The other elements of the configuration are the same as in the embodiment described above.

In a yoke type MR head of the present embodiment, a signal flux fed from a recording medium to the magnetic yoke 23 through the magnetic gap 25 in the surface S facing the medium is led through the magnetic yoke 23 comprising closed magnetic circuit to the MR film 27. A sensing current is supplied to the MR film 27 from the low-resistant lead portion 30 through the magnetic lead portion 29 provided on the end of the first magnetic layer 31.

A yoke type MR head of the present embodiment obtains the same results as the embodiment described above, but in addition, more favorable properties can now be extracted from the MR film 27 since it is disposed on a surface of the first magnetic layer 31. For instance, in the yoke type MR head in the embodiment shown in FIGS. 1 and 2 there is a danger that the MR film 27 will be subject to differences in level which have not been fully eliminated during the flattening process since the MR film 27 is disposed above a back gap 26. Highly precise processing technology is therefore required. In the present embodiment, such difficulties can be prevented. However, since the MR film 27 is provided on the magnetic yoke 23 (first magnetic layer 31), this portion has an excess of shunt current. The use of a magnetic layer having a multi-layered structure such as that shown in FIG. 2 is an effective method of reducing this shunt current and increasing sensitivity. In such as case, the first magnetic layer 31 at least should have a multi-layered structure.

In both the yoke type MR heads shown in FIGS. 1 and 2, the MR film 27 can be provided on a plane magnetic layer by using a ring-shaped magnetic layer (magnetic core) to comprise the magnetic yoke 23. This produces the same results obtained from the yoke type MR head shown in FIG. 3. With this configuration, a magnetic layer with a multi-layered structure such as shown in FIG. 2 is effective.

A first embodiment of a yoke type MR head implementing a second magnetoresistance head of the present invention will next be explained with reference to FIG. 4.

Figure 4:
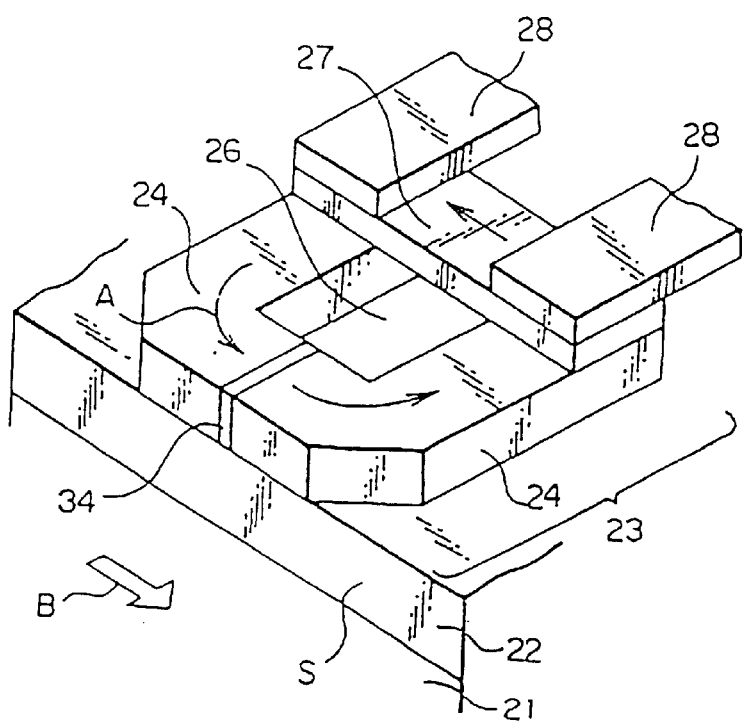
FIG. 4 is a diagonal overview of a general configuration of a first embodiment of a second yoke type MR head of the present invention.

In the MR head shown in FIG. 4, a pair of magnetic layers 24 forming a magnetic yoke 23 are provided on an $Al_2O_3 \cdot TiC$ substrate 21 having an insulating lower layer 22 identical to that described in the embodiment depicted in FIG. 1. A magnetic gap 34 consisting of non-magnetic low-resistance material such as Cu, Ag, Au, Ta, Ti, W, Mo, Nb and such like is provided on the side of the surface S facing the medium of the magnetic yoke 23. A pair of leads 28 consisting of low-resistance material such as Cu are directly connected to the MR film 27. The magnetic yoke 23 is electrically connected to the pair of leads 28 via the MR film 27. The magnetic yoke 23, the MR film 27 and the magnetic gap 34 thus form a ring-shaped magnetic core.

The other elements of the configuration are the same as in the embodiment shown in FIG. 1. In FIG. 4, A indicates the direction of a signal field led from a recording medium to the magnetic yoke 23, i.e. the magnetic path formed by the magnetic yoke 23. B indicates the direction in which the recording medium progresses.

In a yoke type MR head of the present embodiment, the magnetic yoke 23 forms a current path using a magnetic gap 34 consisting of non-magnetic low-resistance material. Current supplied from the leads 28 is therefore shunted to the magnetic yoke 23. In other words, during operation of the yoke type MR head, current fed to the magnetic yoke 23 creates a magnetic field (magnetic field induced by electric current). The same applies for the MR film 27. The magnetic field induced by electric current is substantially perpendicular to the magnetic path formed by the magnetic yoke 23. A bias magnetic field (magnetic bias) is applied to the magnetic yoke 23 and the MR film 27.

Figure 5A:
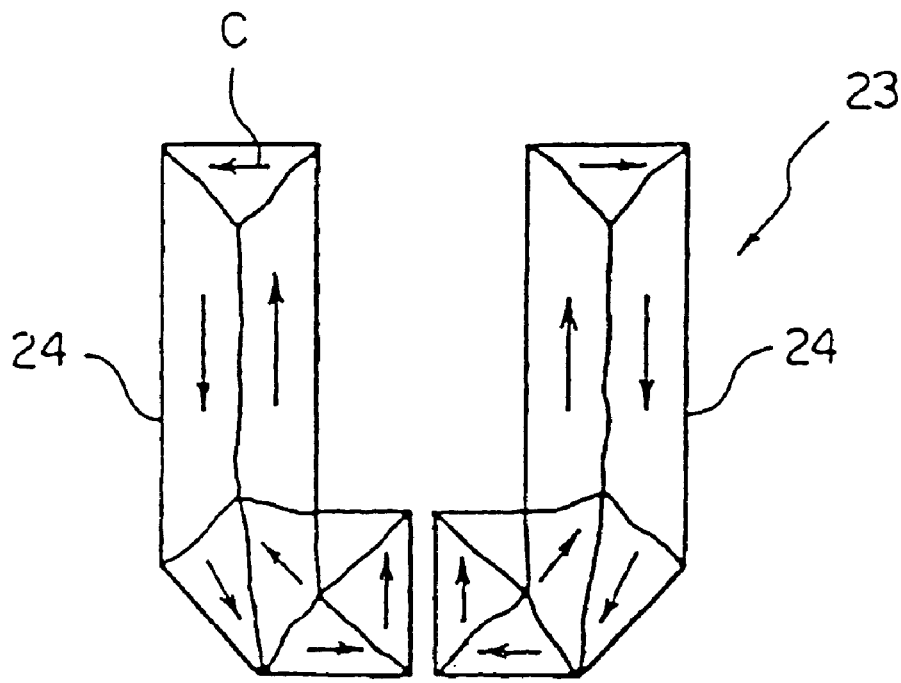
FIG. 5A and FIG. 5B are diagrams explaining magnetic domain control states in the yoke type MR head shown in FIG. 4.
Figure 5B:
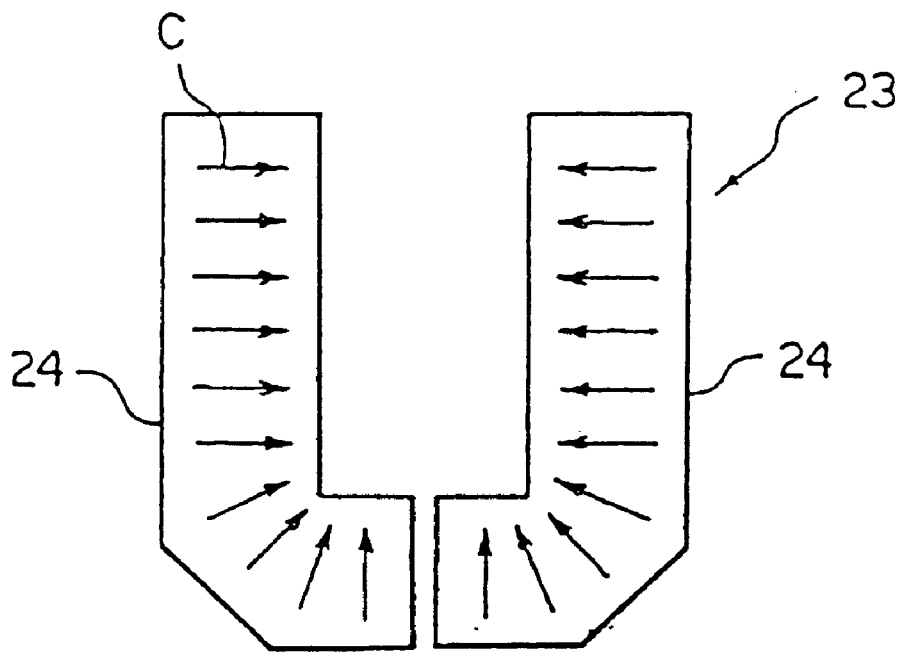

When current is not being supplied to the magnetic yoke 23, the magnetic domains of the magnetic yoke 23 have magnetic walls as shown in FIG. 5A. When current is supplied to the magnetic yoke 23 and a bias magnetic field induced from a magnetic field induced by electric current is applied to the magnetic yoke 23, the magnetic yoke 23 becomes approximately a single magnetic domain as FIG. 5B shows. In FIG. 5A and FIG. 5B, C indicates the direction of the magnetization which has been domain-controlled by the bias magnetic field. As the diagram shows, C is now substantially at right angle to the magnetic path of the magnetic yoke 23.

According to a yoke type MR head of this embodiment, when a signal flux from a recording medium flows into the magnetic yoke 23 and the magnetic domains of the magnetic yoke 23 are controlled, the yoke type MR head shifts to magnetic rotating mode, thereby improving high frequency magnetic permeability and curbing Barkhausen noise. In particular, well-balanced output playback waveforms can be obtained when the magnetization direction C is substantially at a right angle to the magnetic path.

In a yoke type MR head of this embodiment, results pertaining to the shape of the magnetic yoke 23, the position of the MR film 27 and the position relation between the magnetic layers 24 and the MR film 27 (amount of overlap etc.) are obtained by the same method as in the embodiment described earlier. Consequently, improved playback output can be obtained and playback variation can be reduced.

Figure 6:
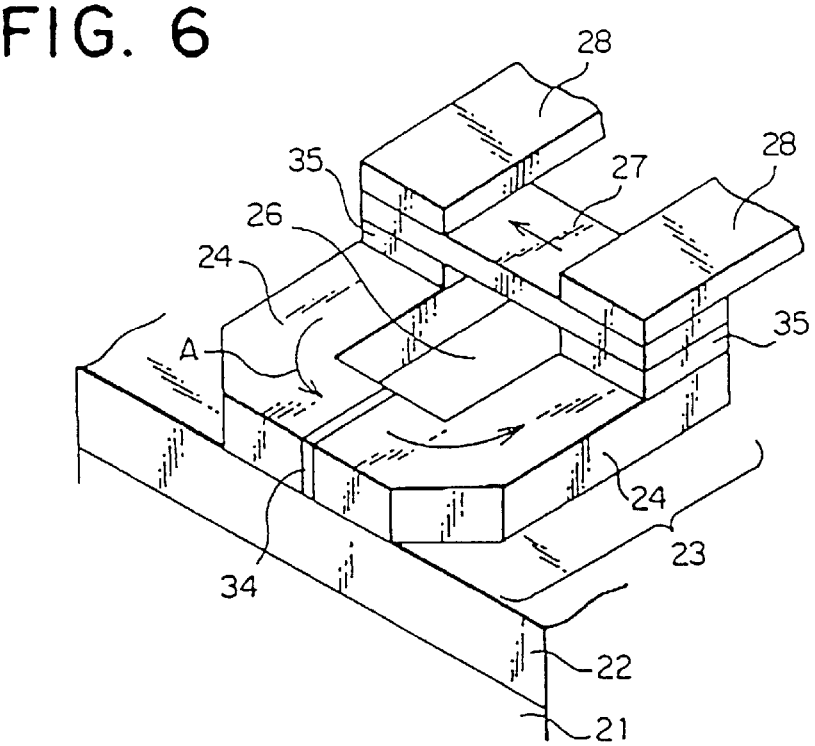
FIG. 6 is a diagonal overview of a modified example of the yoke type MR head shown in FIG. 4.

FIG. 6 shows a configuration of a modified example of the above-mentioned embodiment. In the yoke type MR head in FIG. 6, high-resistance magnetic material layers 35 are provided between each of the magnetic layers 24 and the MR film 27. The amount of current fed to the magnetic yoke 23 can be curbed by providing these high-resistance magnetic material layers 35. In other words, an excess of current can be prevented from flowing to the magnetic yoke 23 and a reduction in the sensing current flowing to the MR film 27 can be curbed. It is therefore possible to curb reduction in the sensitivity of the MR head. Granular film consisting of Co—Al—O and the like or conductive ferrite film or the like consisting of Mn—Zn—FeO and the like can be used as the high-resistance magnetic material layer 35. A hard magnetic film or anti-ferromagnetic film can be used so that a bias magnetic field is applied to the MR film.

Figure 7:
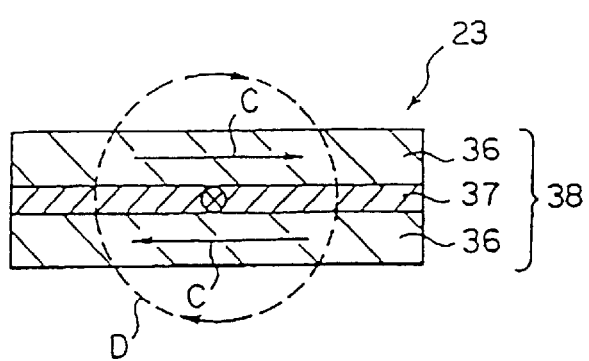
FIG. 7 is a cross-sectional view of a modified example of magnetic yoke in the yoke type MR head shown in FIG. 4.

In the yoke type MR heads shown in FIGS. 4 and 6, a single magnetic layer 24 was used to form the magnetic yoke. The magnetic yoke 23 can also be formed from a non-magnetic low-resistance material layer 37 sandwiched between two ferromagnetic layers 36 as shown in FIG. 7. When a ferromagnetic layer in a single-layer configuration is used, there is a danger that a 180° magnetic wall will remain close to the center of the ferromagnetic layer. However, this 180° magnetic wall can be prevented from occurring by providing a non-magnetic low-resistance material layer 37 between two ferromagnetic layers 36 and feeding current largely to the non-magnetic low-resistance material layer 37. As a result, Barkhausen noise can be prevented even more thoroughly.

Cu, Al, Au, Ag, Zr, Hf, Ta, Ti, Cr and the like may for instance be used as the non-magnetic low-resistance material layer 37. Moreover, when this type of low-resistance material is used, sufficient magnetic field induced by electric current can be applied to each of the ferromagnetic layers 36 even with a small current since the current shunted to the magnetic yoke 23 can be concentrated at the center. In FIG. 7, the broken line D indicates the magnetic field induced by electric current.

Figure 9:
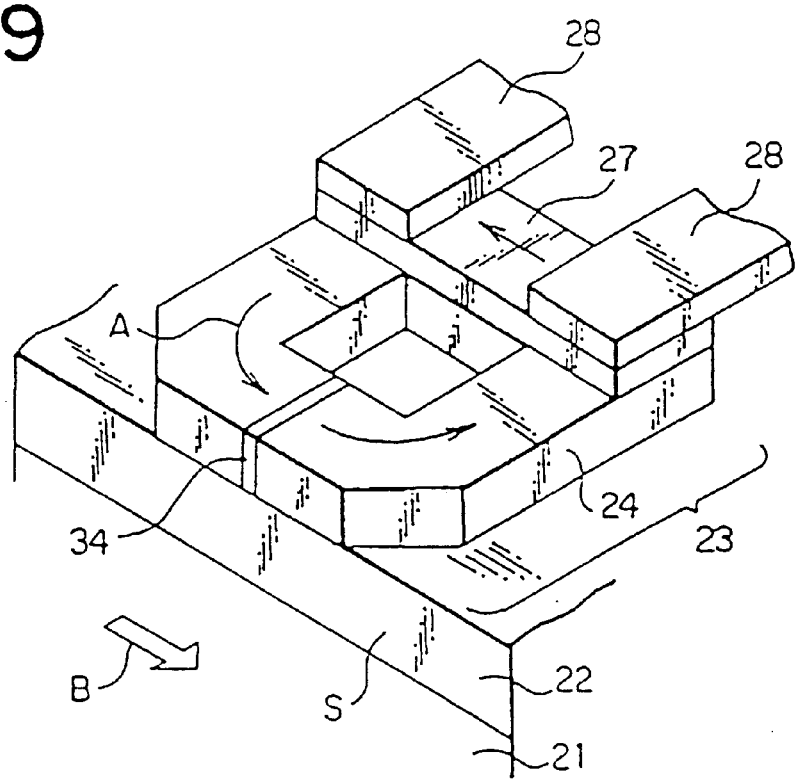
FIG. 9 is a diagonal overview of another modified example of the yoke type MR head shown in FIG. 4.

Furthermore, as shown in FIG. 9, the magnetic yoke 23 can be formed from an implanted laminated layer 39 wherein a non-magnetic low-resistance material layer 37 is implanted near the center of a ferromagnetic layer 36. In an implanted laminated layer 39 such as this, current can be concentrated as in the laminated film 38 shown in FIG. 7 with reflux magnetic domains around the non-magnetic low-resistance material layer 37 in the center. Now, since the direction of magnetization on the surface S facing the medium is parallel to the surface S facing the medium, there is no flux leakage onto the recording medium. There is therefore no danger that the magnetic yoke 23 will erase the signal from the recording medium.

Figure 10:
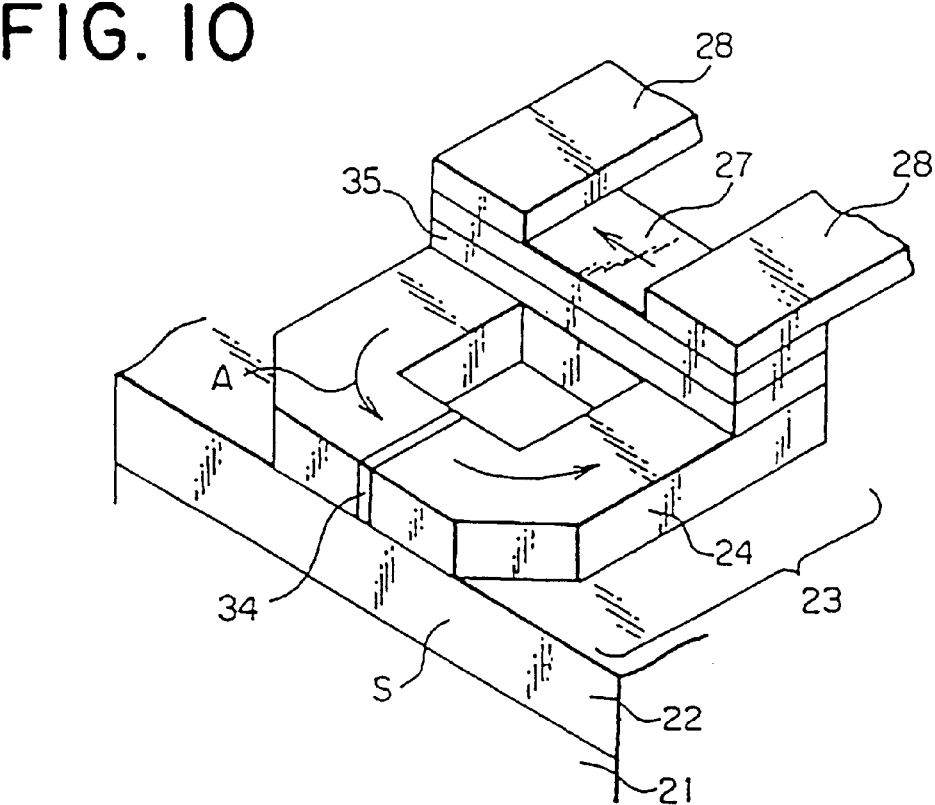
FIG. 10 is a diagonal overview of a further example of the yoke type MR head shown in FIG. 6.

The MR heads shown in FIGS. 4 and 6 are arranged on a back gap 26. Alternatively, the MR head can for instance be arranged on a ring-shaped magnetic layer 24 (ring-shaped magnetic core) with a magnetic gap 34 as shown in FIGS. 9 and 10. In such as case, the FIG. 10 configuration is particularly effective in controlling the amount of current shunted to the magnetic yoke 23.

Figure 11:
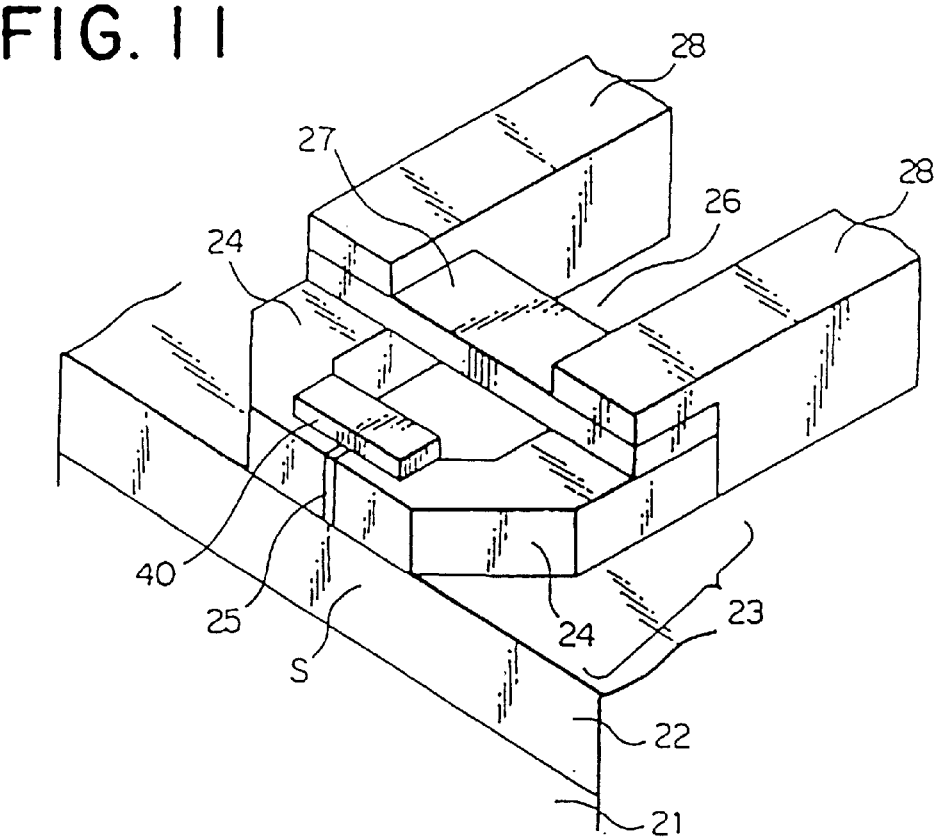
FIG. 11 is a diagonal overview of another modified example of the yoke type MR head shown in FIG. 4.

FIG. 11 shows an example of a yoke type MR head using a magnetic gap 25 consisting of non-magnetic insulating material as in the yoke type MR heads depicted in FIGS. 1 and 2. In this configuration, a current pass 40 consisting of the same non-magnetic low-resistance material as the magnetic gap 34 is provided above the magnetic gap 25. With this current pass 40, similar results as in the above-mentioned embodiment can be obtained.

Each embodiment of the second MR embodiment described above implemented a configuration of the second MR head only. Furthermore, in the yoke type MR head shown in FIG. 1, a magnetic gap 34 consisting of non-magnetic low-resistance material as shown in FIG. 4 may for instance be provided instead of the magnetic gap 25 consisting of non-magnetic insulating material, or a current pass 40 consisting of non-magnetic low-resistance material shown in FIG. 11 may be provided above the magnetic gap 25. Current can be shunted to the magnetic yoke 23 and a bias magnetic field applied using such configurations. A yoke type MR head having such a configuration achieves both the results obtained using a magnetic lead portion 29 and those obtained by the application of a magnetic bias. The properties of the yoke type MR head are thereby further improved.

Figure 8:
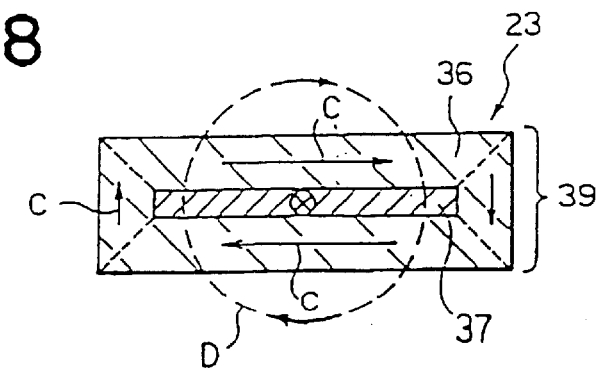
FIG. 8 is a cross-sectional view of another modified example of a magnetic yoke in the yoke type MR head shown in FIG. 4.
Figure 12:
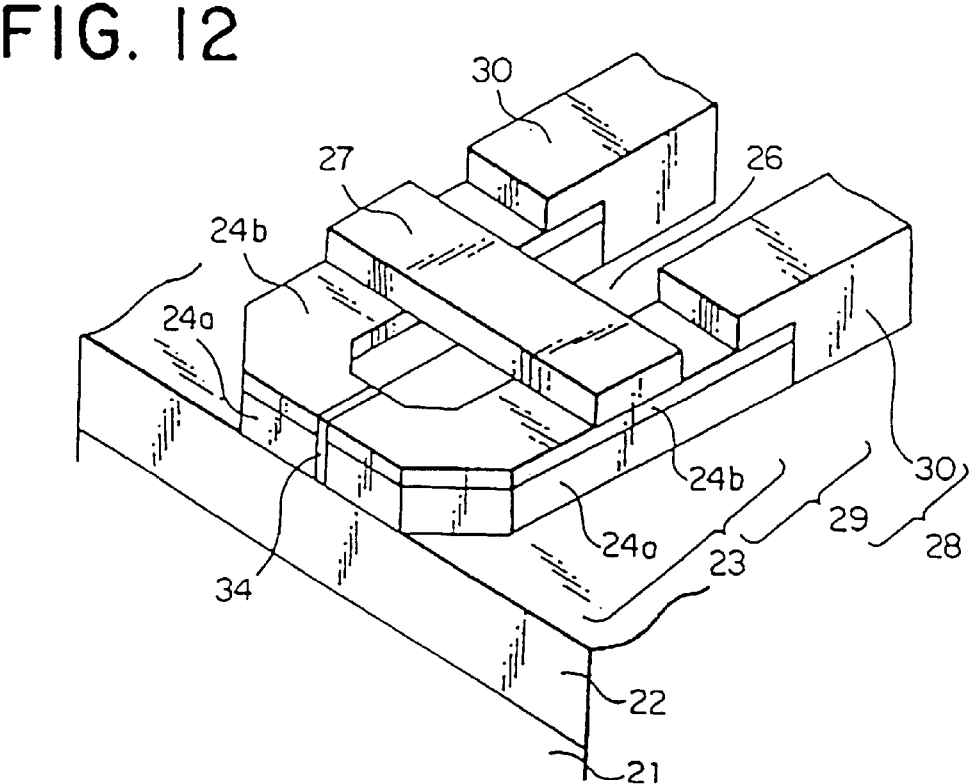
FIG. 12 is a diagonal overview of a general configuration of an embodiment implementing first and second yoke type MR heads of the present invention.

In a yoke type MR head having the structure described above, the entire magnetic layer forming the magnetic yoke 23 and the magnetic lead portion 29 should preferably consist of a first magnetic layer 24 and a second magnetic layer 24b disposed above this a FIG. 12 shows. It is thus possible to curb reduction in sensitivity caused by the shunt current. The configuration of the first magnetic layer 24a and the second magnetic layer 24b used here is the same as that explained in detail earlier. A magnetic layer consisting of the laminated film 38 shown in FIG. 7 or the implanted laminated layer 39 shown in FIG. 8 is more effective than the 2-layered laminated magnetic layer described above.

Furthermore, the same configuration can be used when the longitudinal direction of the MR film 27 faces away from the surface S facing the medium. For instance, in the yoke type MR head shown in FIG. 3, a magnetic gap 34 consisting of non-magnetic low-resistance material may for instance be provided instead of the magnetic gap 25 consisting of non-magnetic insulating material, or a current pass 40 consisting of non-magnetic low-resistance material shown in FIG. 11 may be provided above the magnetic gap 25.

Figure 13:
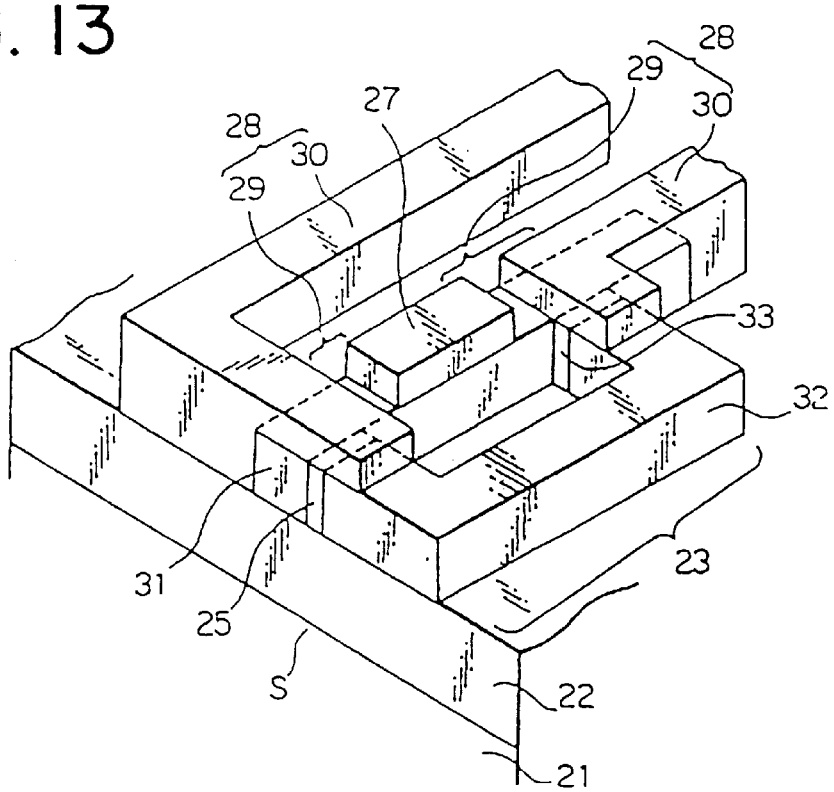
FIG. 13 is a diagonal overview of a general configuration of another embodiment implementing first and second yoke type MR heads of the present invention.
Figure 14:
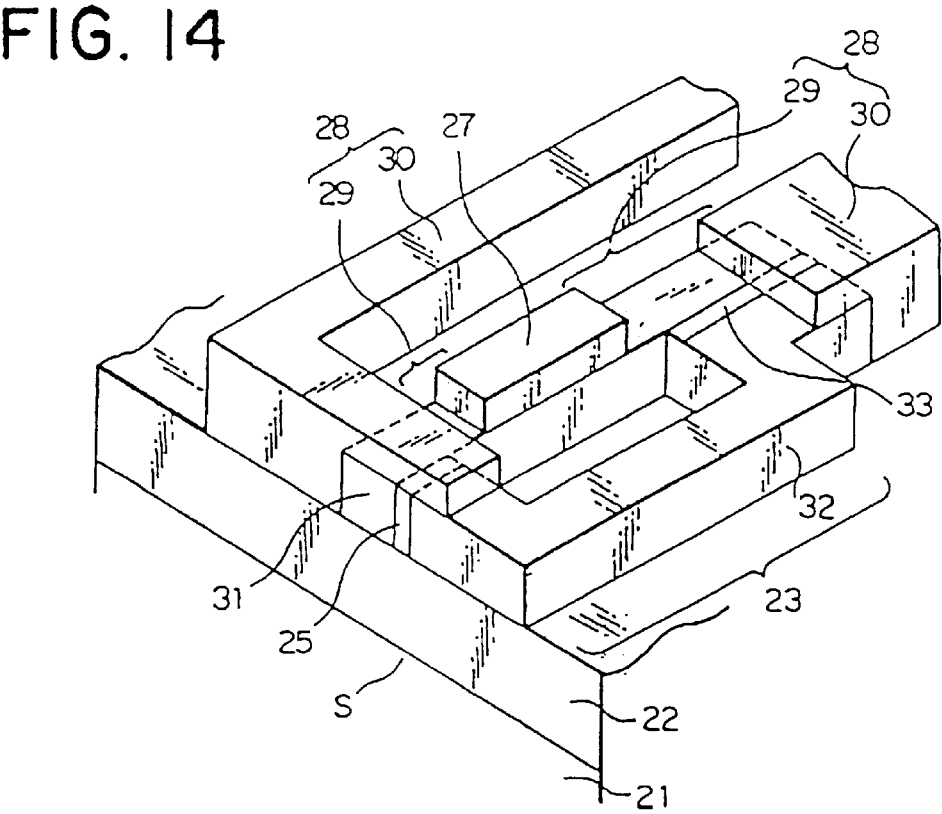
FIG. 14 is a diagonal overview of a modified example of the yoke type MR head shown in FIG. 13.

When a magnetic gap 25 consisting of non-magnetic insulating material is used, the low-resistance lead portions 30 are arranged to reach from a first magnetic layer 31, passing over the magnetic gaps 25 and 33 to a second magnetic layer 32 as shown in FIG. 13. Alternatively, the low-resistant lead portions 30 can be connected to both the first magnetic layer 31 and the second magnetic layer 32 as shown in FIG. 14. In these configurations, the low-resistant lead portion 30 also functions as a current pass over the magnetic gap 25 consisting of non-magnetic insulating material.

In the yoke type MR heads in each of the embodiments described above, in a case in which the magnetic path formed by the signal magnetic field is parallel to the easy axis of the magnetic yoke 23, the magnetization alignment of the magnetic yoke 23 is abruptly reversed when the signal field is reversed as explained above. This can cause signal noise such as Barkhausen noise. In order to reduce such signal noise, the easy axis of the magnetic yoke 23 for leading the signal magnetic field from the recording medium should preferably be at a right angle to the direction of the magnetic path. The following materials and magnetic heat processing methods are suitable for inducing such magnetic anisotropy to the magnetic yoke 23:

(1) The magnetic yoke is formed by combining 2 or more magnetic substances with differing curie temperatures or Neel temperatures, the temperatures are altered in heat processing during or following the formation of the film, an anisotropic magnetic field is induced and orthogonal magnetic anisotropy is induced.

(2) Current is fed to the magnetic yoke while carrying out heat processing (anneal) thereto and magnetic anisotropy is induced by means of a magnetic field induced by electric current.

Of these methods of inducing magnetic anisotropy, method (1) requires a combination of 2 or more magnetic substances; in addition, the distribution of the curie points or Neel temperatures and the heating vibration and the like of each must be considered before selecting the magnetic substances. Not only does annealing in the magnetic field require complex processes such as rotation of the magnetic direction, but in addition the magnetic anisotropy direction and distribution of each magnetic substance film varies according to the temperature needed to change the magnetic field direction. It is consequently difficult to obtain stable properties with a high degree of reliability.

In contrast, method (2) uses a magnetic field induced by electric current to induce magnetic anisotropy by feeding electric current to the magnetic yoke during heat processing. When the magnetic field is induced electrically in this way, even if the magnetic yoke has an indented portion, magnetic anisotropy can be induced in accordance with the position of each indent since the magnetic field is perpendicular to the current.

In other words, magnetic anisotropy varying according to each position can be induced in compliance with the shape of the magnetic yoke. Furthermore, since the magnetic field is induced using a current, it is possible to finely control the direction of the magnetic field applied to the magnetic yoke. By contriving the path of the current during heat processing, magnetic anisotropy in which the axis of easy magnetization and the magnetic path are substantially at right angles to one another can be induced to the entire magnetic yoke, and even to C-shaped, O-shaped or L-shaped magnetic yokes or magnetic yokes in other shapes.

Magnetic anisotropy wherein the axis of easy magnetization and the magnetic path are substantially at right angles to one another prevents abrupt magnetization reversal of the magnetic yoke when the signal magnetic field reverses. The occurrence of signal noise such as Barkhausen noise can therefore be curbed. Since only a 1-directional magnetic field can be applied when a normal external coil or the like is used to apply the magnetic field, it is not possible to induce magnetic anisotropy at a right angle to the magnetic path to the whole magnetic yoke.

Magnetic anisotropy is induced by maintaining the magnetic yoke at a temperature greater than the temperature at which the magnetic anisotropy of the magnetic yoke moves for a fixed period of time while feeding a current of approximately 0.1~100 mA to the magnetic yoke. Alternatively, magnetic anisotropy can be induced by applying a pulse current of approximately 1 mA~1 mA to a magnetic yoke. When using such a pulse current, it is sometimes possible to induce magnetic anisotropy even if the magnetic yoke is approximately at room temperature.

Figure 15A:
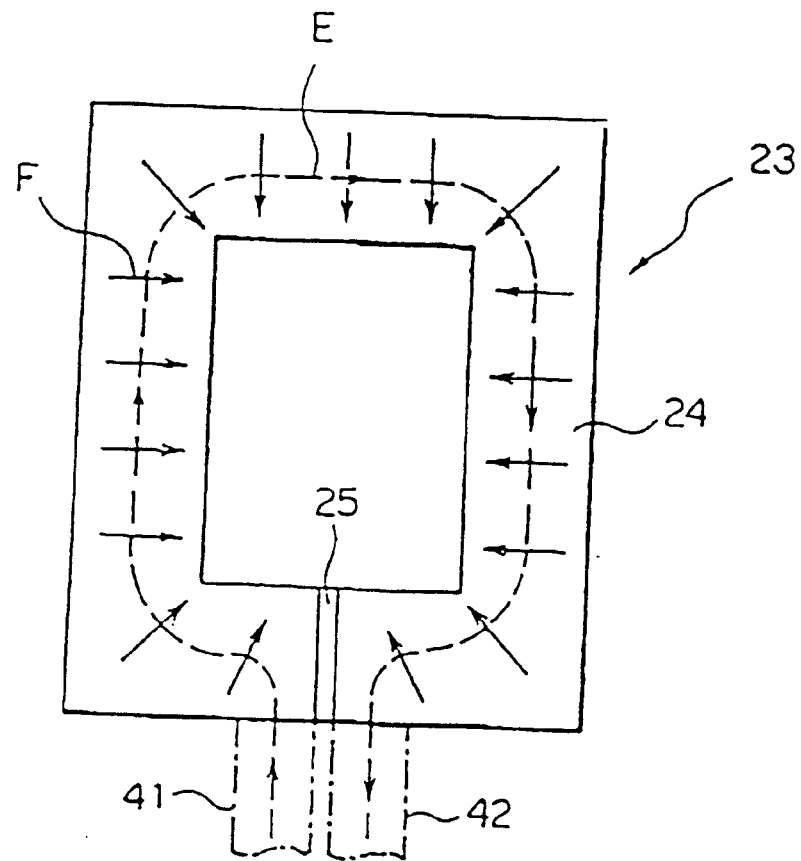
FIG. 15A and FIG. 15B are diagrams depicting a magnetic yoke in an embodiment of a third yoke type MR head of the present invention.
Figure 15B:
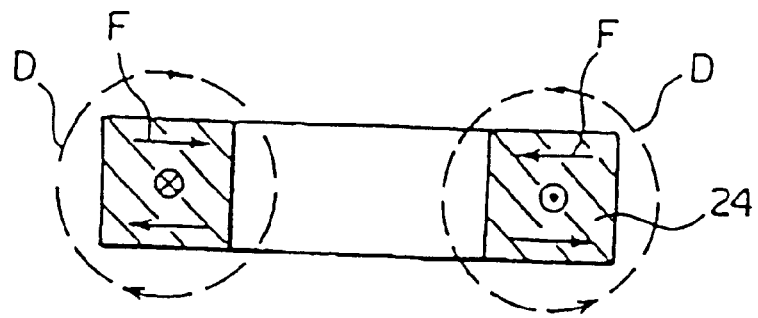

FIG. 15A and FIG. 15B shows a magnetic yoke 23 which has undergone heat processing (annealing in a magnetic field induced by electric current) while applying a magnetic field induced by the electric current thereto in the manner explained above. This magnetic yoke 23 is formed from a ring-shaped magnetic layer 24 (a ring-shaped magnetic core) having a magnetic gap 25 consisting of non-magnetic insulating material. A MR film 27 is disposed on this magnetic layer 24.

In the structure of this yoke type MR head, the magnetic gap 34 consisting of non-magnetic low-resistance material as shown in FIG. 4 or FIG. 9 for instance has been replaced with as magnetic gap 25 consisting of non-magnetic insulating material. This yoke type MR head corresponds to an embodiment of a third magnetoresistance head of the present invention.

When a magnetic gap 25 consisting of non-magnetic insulating material is used as shown in FIG. 15A and FIG. 15B, a current inflow entrance 41 and a current outflow exit 42 are for instance provided on both edges of the magnetic gap 25, thought which the current (indicated by the symbol E) is fed through the magnetic yoke 23. Heat processing is performed while applying an electric magnetic field (indicated by the broken line D) to the magnetic yoke 23.

A current E supplied from the current inflow entrance 41 provided in close proximity to the magnetic gap 25 flow along the same route as the magnetic path of the magnetic yoke 23 to the current outflow exit 42. Magnetic anisotropy is induced to the magnetic yoke 23 by means of a magnetic field induced by electric current D induced perpendicular to current E. Magnetic anisotropy in which the magnetic path and the axis of easy magnetization F are substantially at right angles to each other is thereby obtained for the whole magnetic yoke 23. Thus magnetic anisotropy in a direction differing depending on the position is obtained in accordance with the shape of the magnetic yoke 23; in other words, a magnetic yoke 23 in which the axis of easy magnetization F has differing directions is obtained.

In a yoke type MR head having a magnetic yoke 23 such as this wherein the magnetic path and the axis of easy magnetization F are substantially at right angles to each other throughout the magnetic yoke 23, it is possible to prevent abrupt magnetization reversal of the magnetic yoke when the signal magnetic field reverses. Therefore, the occurrence of signal noise such as Barkhausen noise can therefore be curbed and a yoke type MR head with more stable properties can be obtained.

Figure 16:
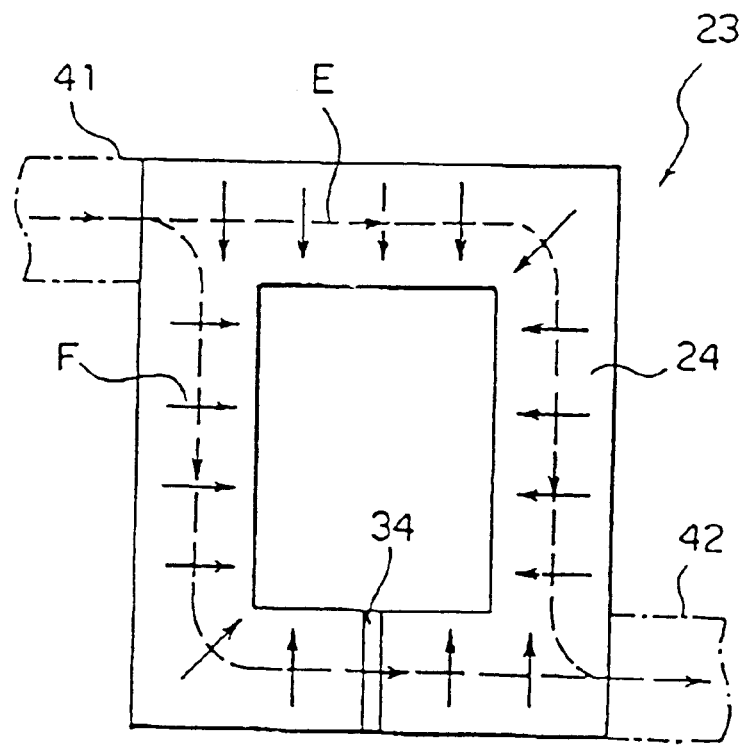
FIG. 16 is a diagram showing a modified example of the magnetic yoke shown in FIG. 15A and FIG. 15B.

Alternatively, when a magnetic gap 34 consisting of non-magnetic low-resistance material is used as shown in FIG. 16 for instance, a current inflow entrance 41 and a current outflow exit 42 are provided on opposing corners of the magnetic yoke 23. By feeding current E through the whole of the magnetic yoke 23 while performing heat processing, magnetic anisotropy can be obtained wherein the magnetic path and the axis of easy magnetization F are substantially at right angles to each other throughout the magnetic yoke 23. Moreover, when a magnetic gap 25 consisting of non-magnetic insulating material is used, the same magnetic anisotropy as in FIG. 16 can be obtained by providing a current pass 40 consisting of non-magnetic low-resistance material to the magnetic gap 25 portion as shown in FIG. 17 for instance.

Figure 17:
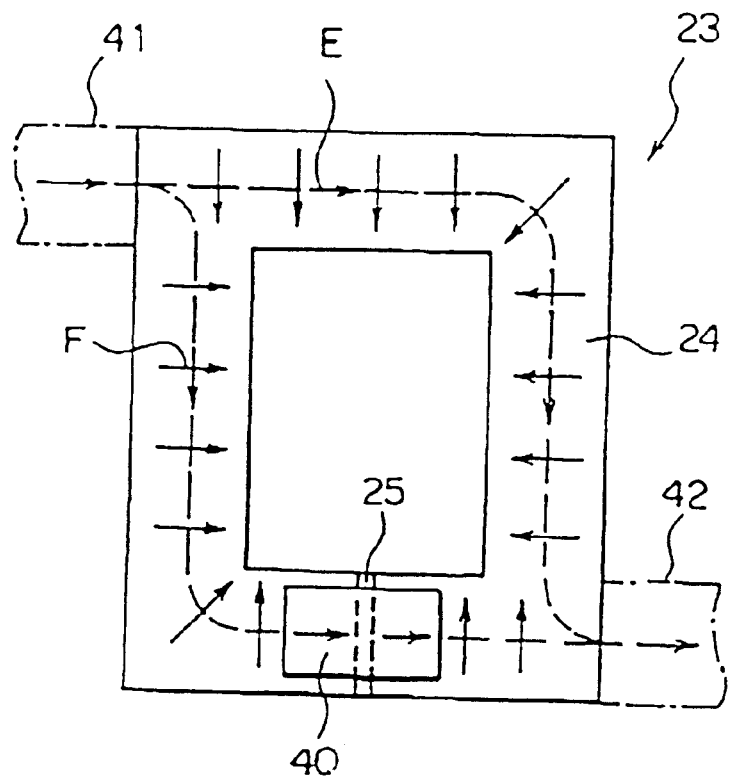
FIG. 17 is a diagram showing another modified example of the magnetic yoke shown in FIG. 15A and FIG. 15B.

Furthermore, the yoke type MR head having the magnetic yoke 23 shown in FIGS. 16 and 17 can have a configuration wherein a bias magnetic field (magnetic bias) induced by a current supply during operation as explained above is applied to the magnetic yoke 23. Signal noise such as Barkhausen noise can consequently be curbed still further by controlling the magnetic domains of the magnetic yoke 23 and by controlling the magnetic anisotropy.

Figure 18:
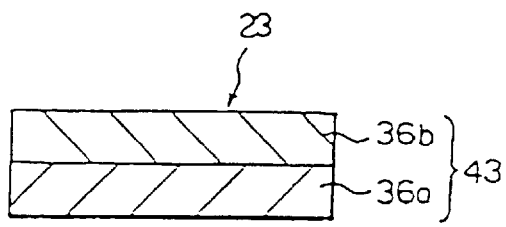
FIG. 18 is a cross-sectional view of a modified example of a magnetic layer forming the magnetic yoke shown in FIG. 15A and FIG. 15B.

When controlling magnetic anisotropy by means of a magnetic field induced by electric current, the structure of the magnetic layer 24 forming the magnetic yoke 23 is not limited to the single-layer structure shown in FIG. 15A and FIG. 15B. For instance, a laminated film 43 comprising 2 or more ferromagnetic layers 36a and 36b as shown in FIG. 18 can be used.

Figure 19:
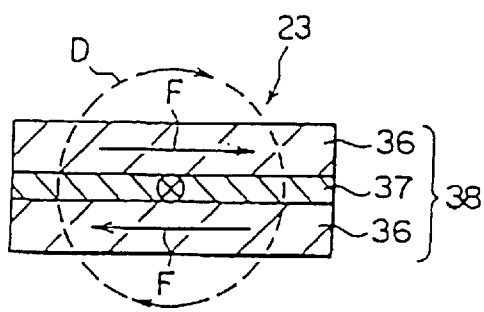
FIG. 19 is a cross-sectional diagram depicting a configuration example of the magnetic yoke shown in FIG. 15A and FIG. 15B in which a laminated film consisting of ferromagnetic layers and nonmagnetic layers has been utilized.

Furthermore, laminated film consisting of both ferromagnetic layers and non-magnetic layers is especially effective in inducing magnetic anisotropy. FIG. 19 depicts a laminated film 38 wherein a non-magnetic low-resistance material layer 37 is sandwiched between 2 ferromagnetic layers 36. Since still magnetic coupling occurs easily between the upper ferromagnetic layer 36 and the lower ferromagnetic layer 36 in this type of laminated film 38, it is easier for the magnetic flux to penetrate each of the ferromagnetic layers 36 and a magnetic field induced by electric current can consequently be applied effectively to the magnetic yoke 23.

Figure 20:
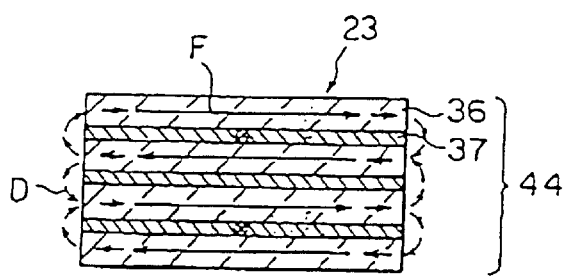
FIG. 20 is a cross-sectional diagram depicting another configuration example of the magnetic yoke shown in FIG. 15A and FIG. 15B in which a laminated film consisting of ferromagnetic layers and non-magnetic layers has been utilized.
Figure 21:
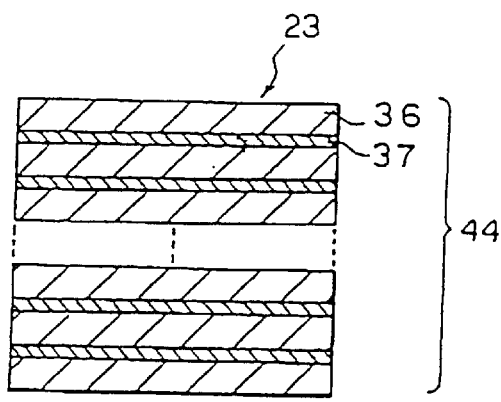
FIG. 21 is a cross-sectional view of a modified example of the magnetic yoke shown in FIG. 20.

As shown in FIG. 20, a multi-layered laminated film 44 comprising alternating ferromagnetic layers 36 and non-magnetic layers 37 can also be used as the magnetic yoke 23. In this case, magnetic anisotropy can be induced effectively to each layer of a plurality of the ferromagnetic layers 36 by supplying a current selectively to a plurality of the non-magnetic layers 37. When current is to be fed selectively to a plurality of non-magnetic layers 37, only the non-magnetic low-resistance material layer 37 to which current is supplied is formed from non-magnetic low-resistance material. The non-magnetic layers to which no current is fed are formed from non-magnetic insulating material. There is no particular limit on the number of layers forming the laminated film 44 and it is therefore possible to use a laminated film 44 having a structure expressed as: (ferromagnetic layer 36/non-magnetic layer 37)$_n$/ferromagnetic layer 36 (N≧1) as shown in FIG. 21.

Figure 22:
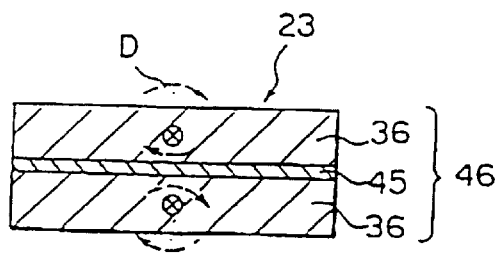
FIG. 22 is a cross-sectional diagram depicting a further configuration example of the magnetic yoke shown in FIG. 15A and FIG. 15B in which a laminated film consisting of ferromagnetic layers and non-magnetic layers has been utilized.

As FIG. 22 shows, a laminated film 46 wherein a non-magnetic insulating layer 45 is sandwiched between a pair of ferromagnetic layers 36 may also be used. $Al_2O_3$, $SiO_x$, AlN, $SiN_x$, BN or such like can be used to form the non-magnetic insulating layer 45. With this type of laminated film 46, a magnetic field induced by electric current can be applied to the magnetic yoke 23 with a higher degree of reliability than when a single-layer film is used. Still magnetic coupling between upper and lower ferromagnetic layers 36 is prompted by separating the ferromagnetic layers with a non-magnetic layer thereby facilitating the inducing of uniaxial anisotropy. The laminated film 38 depicted in FIG. 19 and the laminated film 44 depicted in FIGS. 20 and 21 are also suitable for applying a magnetic bias generated by a current supply to the magnetic yoke 23. An improved structure can thus be produced.

Laminated film in which at least one anti-ferromagnetic layer has also been inserted adjacent to the ferromagnetic layer can be used as the magnetic yoke 23 described above. That is to say, the magnetic yoke 23 can be formed from laminated film consisting of a ferromagnetic layer and an anti-ferromagnetic layer, or laminated film consisting of a ferromagnetic layer, a non-magnetic layer and an anti-ferromagnetic layer. A laminated film in which an anti-ferromagnetic layer is provided adjacent to at least one of the ferromagnetic layers with the structure: (ferromagnetic layer/non-magnetic layer)$_n$/ferromagnetic layer (n≧1) is one example of a laminated film of this type.

When an anti-ferromagnetic layer is provided adjacent to a ferromagnetic layer in this way, the replacement magnetic anisotropy from the anti-ferromagnetic layer further secures the uniaxial anisotropy in a predetermined direction which has been induced to the ferromagnetic layer by the magnetic field induced by electric current. Such secure magnetic anisotropy is particularly effective against rising head temperature during operation. FeMn, IrMn, NiMn, RhMn, PtMn, PdMn, CrMn, IrCrMn, PdPtMn, CrMn or an alloy of these or NiO or such like may be used as the anti-ferromagnetic layer.

Figure 23:
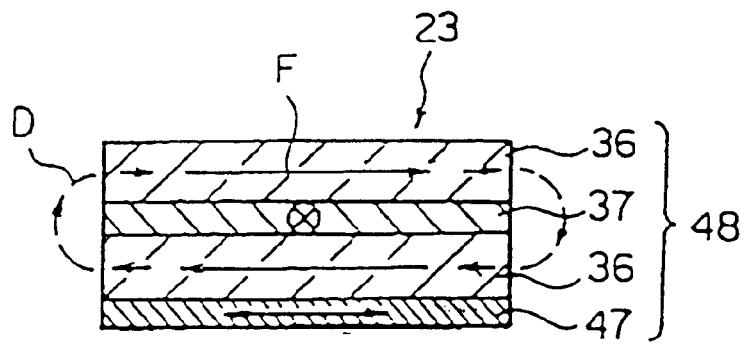
FIG. 23 is a cross-sectional diagram depicting a configuration example of the magnetic yoke shown in FIG. 15A and FIG. 15B in which a laminated film consisting of anti-ferromagnetic layers and ferromagnetic layers and non-magnetic layers has been utilized.
Figure 24:
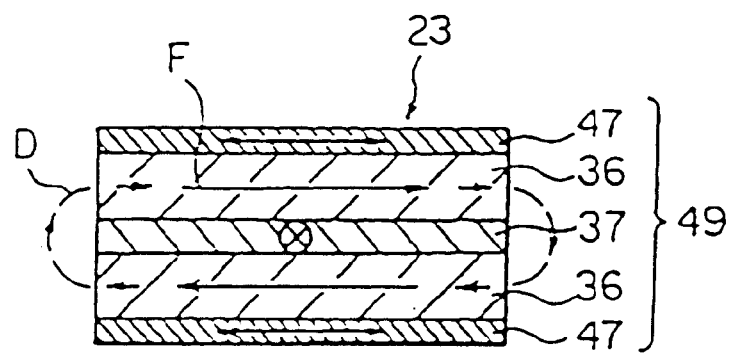
FIG. 24 is a cross-sectional view of a modified example of the magnetic yoke shown in FIG. 23.
Figure 25:
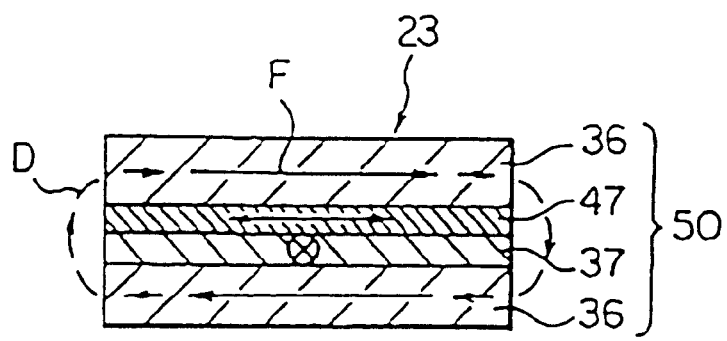
FIG. 25 is a cross-sectional view of another modified example of the magnetic yoke shown in FIG. 23.

A laminated film 48 in which a non-magnetic low-resistance material layer 37 is sandwiched between 2 ferromagnetic layers 36 and an anti-ferromagnetic layer 47 is provided next to one of these ferromagnetic layers 36 as shown in FIG. 23, or a laminated film 49 in which an anti-ferromagnetic layer is provided next to each of 2 ferromagnetic layers 36 as shown in FIG. 24 are two of the possible structures for laminated film incorporating anti-ferromagnetic layers. Alternatively, the anti-ferromagnetic layer may be provided on the inner side of the laminated film 50 as shown in FIG. 25. With the laminated film 50 it is possible to induce replacement magnetic anisotropy efficiently to each of the ferromagnetic layers 36. These laminated films can also be formed without a non-magnetic layer.

Figure 26:
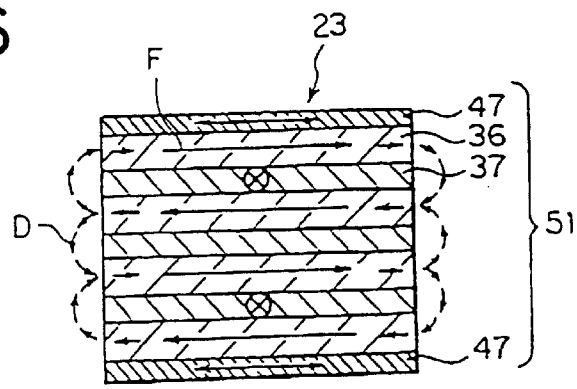
FIG. 26 is a cross-sectional diagram depicting another configuration example of the magnetic yoke shown in FIG. 15A and FIG. 15B in which a laminated film consisting of anti-ferromagnetic layers and ferromagnetic layers and non-magnetic layers has been utilized.
Figure 27:
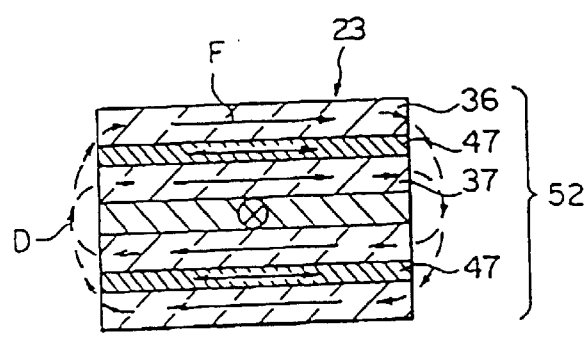
FIG. 27 is a cross-sectional view of a modified example of the magnetic yoke shown in FIG. 26.

A laminated film including an anti-ferromagnetic layer may also have a multi-layered structure alternating ferromagnetic layers 36 with non-magnetic layers 37 wherein anti-ferromagnetic layers 47 are provided next to each of the outer side ferromagnetic layers 36 as in the laminated film 51 shown in FIG. 26, or the anti-ferromagnetic layers may be provided on the inner sides as in the laminated film 52 shown in FIG. 27.

It is not necessary for the non-magnetic layer 37 to be a non-magnetic low-resistance material layer as in the above descriptions of laminated film including anti-ferromagnetic layers; a non-magnetic insulating layer 45 as shown in FIG. 22 is equally acceptable. When a non-magnetic insulating layer 45 only is used, the low-resistance metallic layer needed for applying the magnetic field induced by electric current is provided close to the laminated film. This metallic layer will be explained below.

In the laminated film 49 shown in FIG. 24, the film thickness of the non-magnetic layer 37 should for instance preferably be not less than 5 nm, the inter-layer coupling between each of the ferromagnetic layers 36 should preferably be reduced, and still magnetic coupling should preferably be used between the ferromagnetic layers 36. Secure uniaxial anisotropy can be induced to each of the ferromagnetic layers 36 by providing an anti-ferromagnetic layer 47 to each of the ferromagnetic layers 36 in this way. When the inter-layer coupling between the ferromagnetic layers 36 have been eliminated by means of the non-magnetic insulating layers 45, the same structure can be applied to induce a secure uniaxial anisotropy to each of the ferromagnetic layers 36.

When the laminated film 48 shown in FIG. 23 or the laminated film 51 shown in FIG. 26 are used, uniaxial anisotropy can also be induced to all the ferromagnetic layers 36 by setting the film thickness of the non-magnetic layer 37 at for instance not more than 3 nm and loosely coupling the ferromagnetic layers 36.

The exchange interaction executed between the ferromagnetic layers 36 and anti-ferromagnetic layer 47 should preferably be regulated to an appropriate size. If the exchange interaction of the ferromagnetic layers 36 and the anti-ferromagnetic layer 47 is too strong, the magnetization of the ferromagnetic layers 36 will become fixed. As a consequence, the magnetization of the magnetic yoke 23 will not rotate freely in the signal magnetic field. Conversely, if the exchange interaction of the ferromagnetic layers 36 and the anti-ferromagnetic layer 47 is to weak, it will not be possible to induce sufficient uniaxial anisotropy to the ferromagnetic layers 36 during the exchange interaction. The size of the exchange interaction can be regulated by adjusting the film thickness of the ferromagnetic layers 36 or the anti-ferromagnetic layer 47, or by inserting a thin film of around 0.1~3 nm at the interface.

Due to the above reasons, the anti-ferromagnetic layer 47 is set at a thickness selected from the approximate range of 2~50 nm. The thickness of the ferromagnetic layers 36 is selected from the approximate range of 1~500 nm, although the most preferable thickness is within the approximate range 10~250 nm. The non-magnetic layers 37 and 45 are set at thicknesses within the approximate range 0.5~100 nm and most preferably within the range 1~10 nm. The thickness of the laminated film which includes an anti-ferromagnetic layer is set so that the actual thickness of the magnetic yoke 23 is narrower than the width of the recording medium track; a thickness of between approximately 10~2000 nm is preferable and between approximately 100~500 nm is ideal. When an anti-ferromagnetic layer 47 is disposed on the outer side of the magnetic yoke 23, the actual thickness of the magnetic yoke 23 is the thickness excluding the thickness of this layer.

Figure 28:
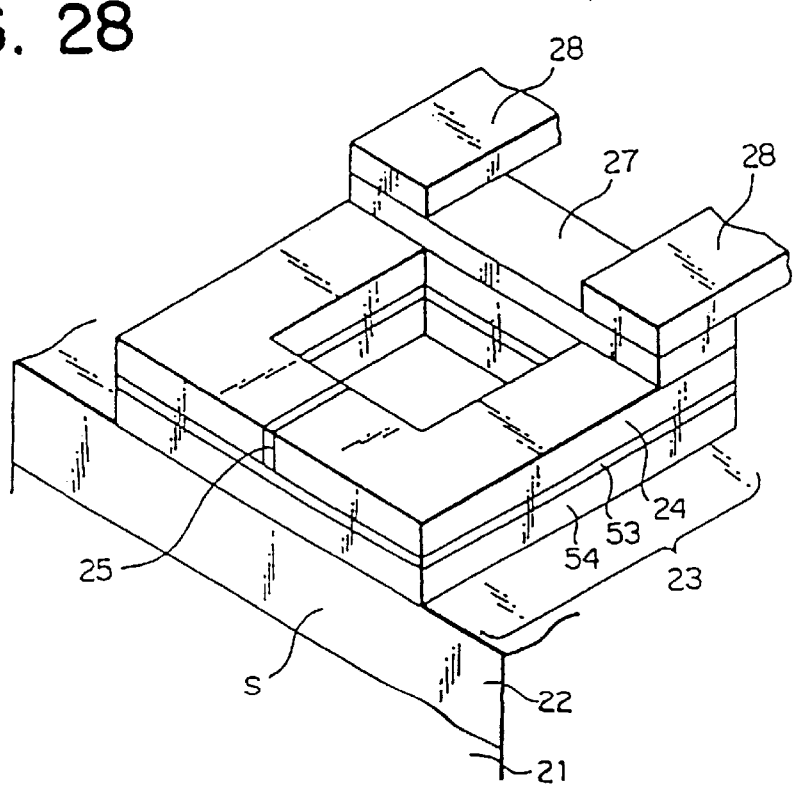
FIG. 28 is a diagonal overview of a general configuration of another embodiment of a third yoke type MR head of the present invention.

FIG. 28 shows another example of a third magnetoresistance head of the present invention. In the yoke type MR head shown in this diagram, a non-magnetic metallic layer 54 is provided beneath the magnetic layers 24 forming the magnetic yoke 23 with an insulating layer 53 in between. The non-magnetic metallic layer 54 is a current application layer for applying a magnetic field induced by electric current and should preferably be formed from good conductors such as Au, Al, or Cu.

The thickness of this non-magnetic metallic layer 54 for applying a magnetic field induced by electric current should preferably be approximately 1~1000 nm. If the thickness of the non-magnetic metallic layer 54 is less than 1 nm, the current will have extremely high density, and current may concentrate in one portion of the electric circuit and the current flow may become non-uniform due to Joule heating or the like. Or, if the thickness of the non-magnetic metallic layer 54 exceeds 1000 nm, current density will be so low that the magnetic field induced by electric current to be applied to the magnetic layer 24 will be reduced and it may not be possible to sufficiently control the magnetic anisotropy generated by the magnetic field induced by electric current. The thickness of the non-magnetic metallic layer 54 should more preferably be in the range of 10~800 nm and ideally 50~500 nm.

$Al_2O_3$ is used to form the insulating layer 53 provided between the magnetic layer 24 and the non-magnetic metallic layer 54. The magnetic layer 24 does not have to be a single layer and a laminated film consisting of 2 or more ferromagnetic layers such as a laminated film consisting of ferromagnetic layer and a non-magnetic layer is also suitable. Since the non-magnetic metallic layer 54 for applying a magnetic field induced by electric current is provided separately, the magnetic layer 24 may also include an insulating substance.

By separately providing the non-magnetic metallic layer 54 for supplying the magnetic field induced by electric current it becomes possible to freely specify the direction of the magnetic field induced by electric current applied to the magnetic layer 24. As a result, the direction of the magnetic anisotropy of the magnetic yoke 23 can be more finely controlled. Magnetic anisotropy identical to that in FIG. 16 can be induced to the magnetic layer 24 by providing a current inflow entrance 41 and a current outflow exit 42 at opposite corners of the non-magnetic metallic layer 54 as shown for instance in FIG. 29.

Figure 30:
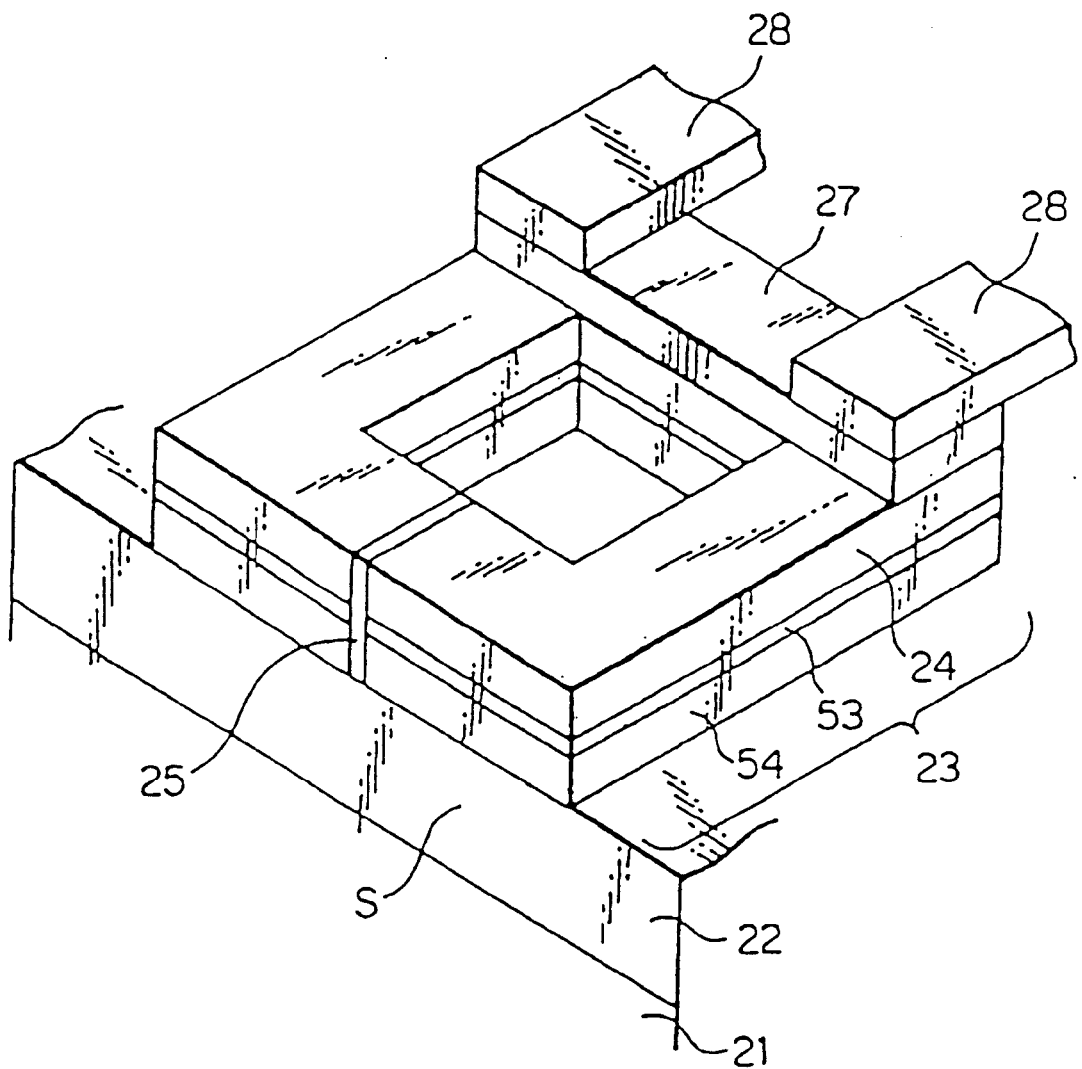
FIG. 30 is a diagonal overview of a modified example of the yoke type MR head shown in FIG. 28.
Figure 31:
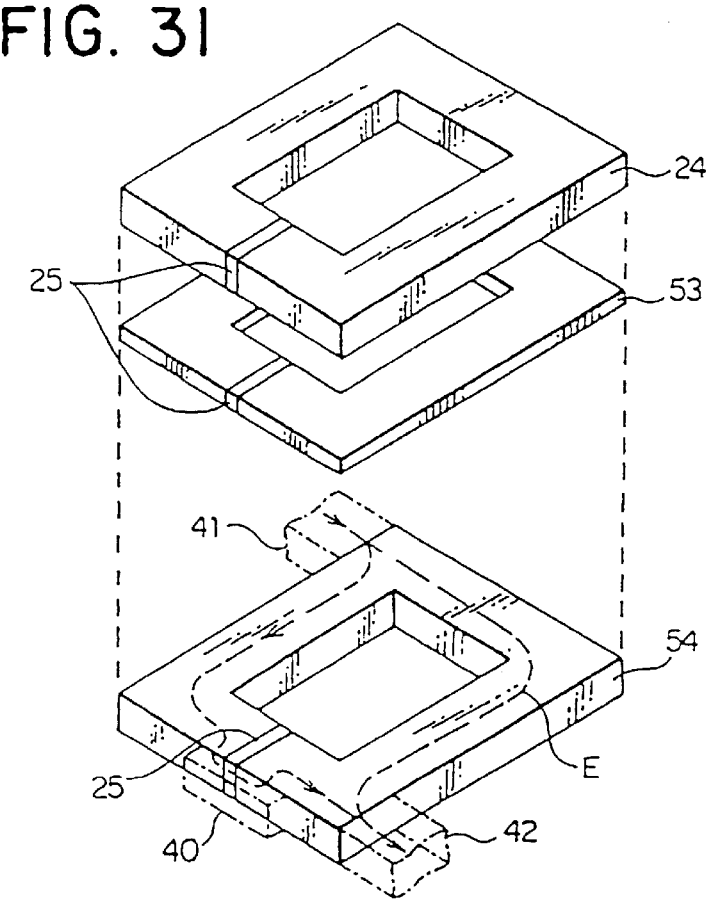
FIG. 31 is a diagram for explaining an example of the current application state during heat processing of the yoke type MR head shown in FIG. 30.
Figure 32:
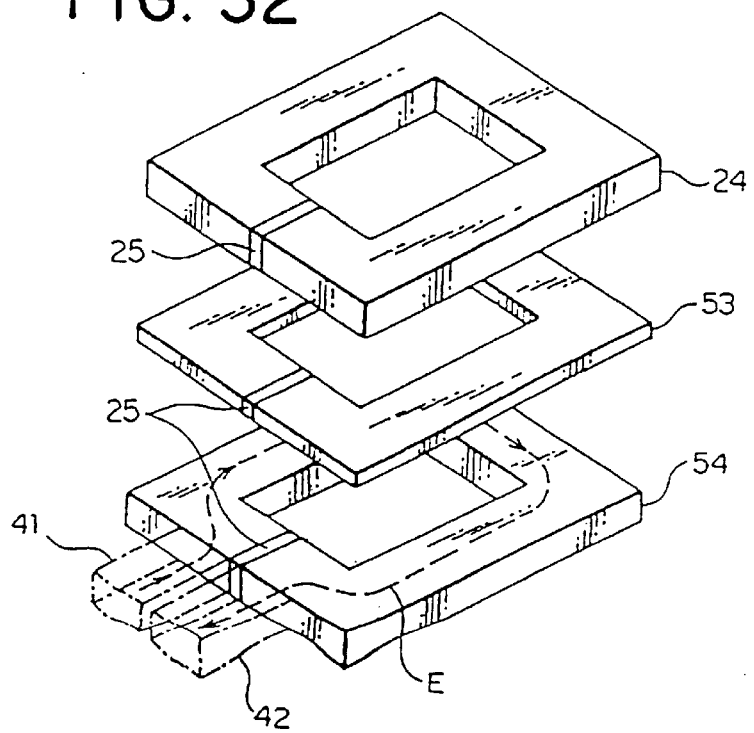
FIG. 32 is a diagram for explaining another example of the current application state during heat processing of the yoke type MR head shown in FIG. 30.

The non-magnetic metallic layer 54 for applying a magnetic field induced by electric current can be structured with a magnetic gap 25 consisting of non-magnetic insulating material continuing through the insulating layer 53 to the non-magnetic metallic layer 54 as depicted in FIG. 30. In this structure, in addition to providing a current inflow entrance 41 and a current outflow exit 42 at opposite corners of the non-magnetic metallic layer 54, a current pass 40 is provided to the magnetic gap 25 portion as for instance shown in FIG. 31. Magnetic anisotropy can thereby be induced more easily to the magnetic layer 24. Alternatively, magnetic anisotropy can be induced more easily to the magnetic layer 24 by providing a current inflow entrance 42 and a current outflow exit 42 on by ends of the magnetic gap 25 as shown in FIG. 32.

Magnetic yoke 23 heat processing should preferably be performed to at least a plurality of magnetic yokes 23 on a substrate while applying a magnetic field induced by electric current to the magnetic yokes 23 in a single operation. Heat processing may also be executed after providing the MR film and the leads. In this case, the plurality magnetic yokes 23 should preferably be connected in series so that current can be supplied to them in a single operation.

Figure 29:
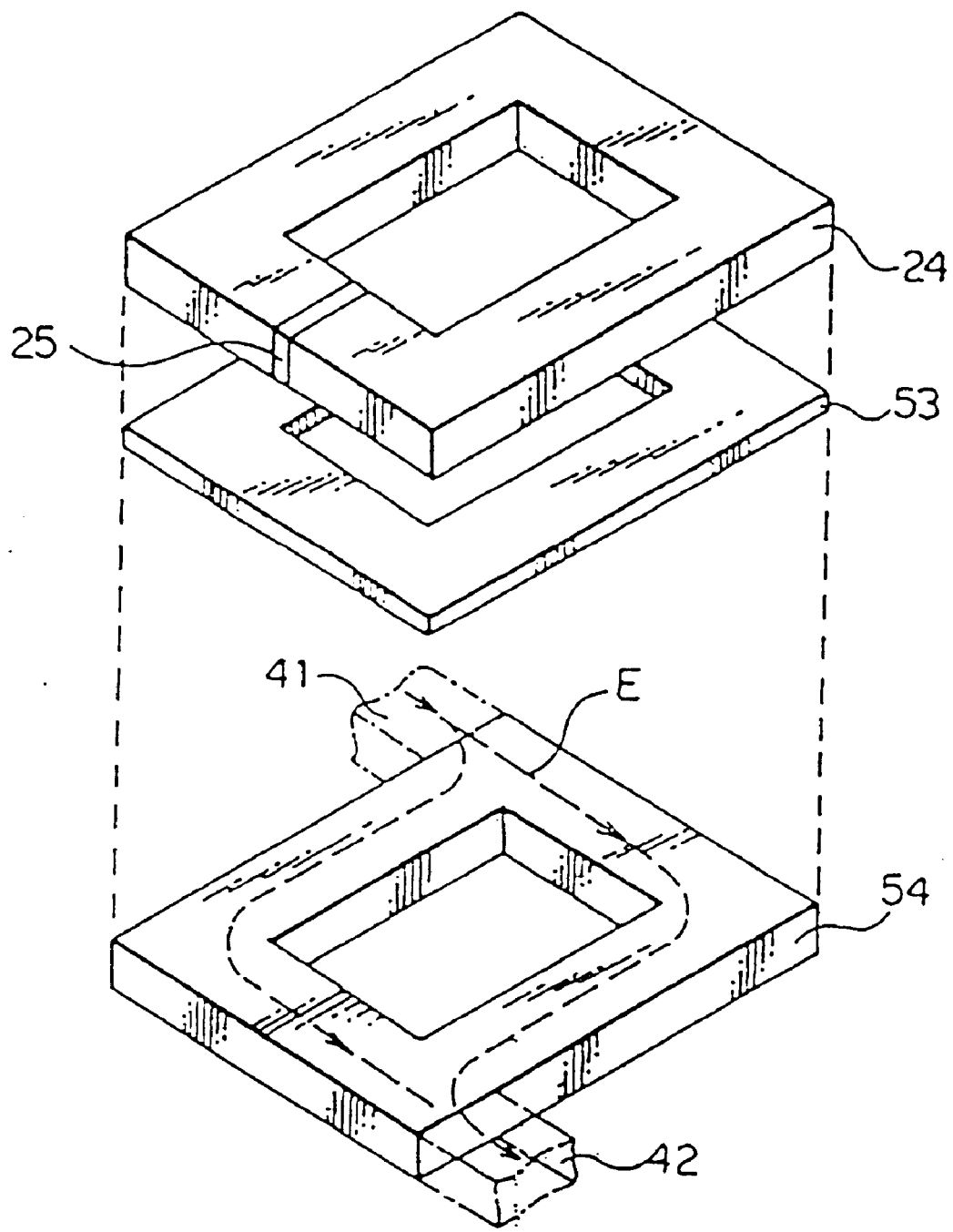
FIG. 29 is a diagram explaining the current application state during heat processing of the yoke type MR head shown in FIG. 28.
Figure 33:
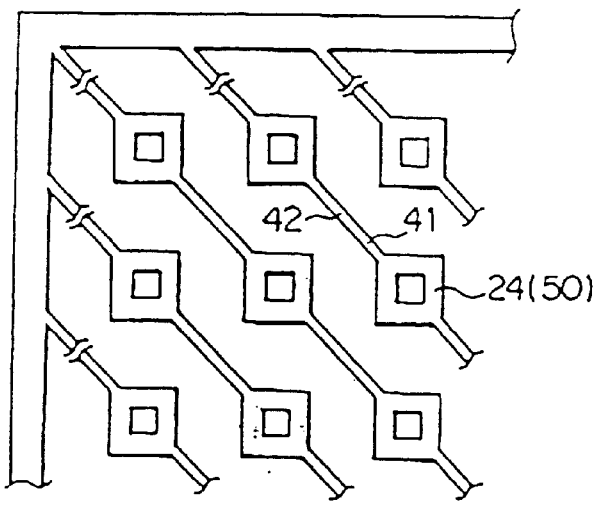
FIG. 33 is a diagram depicting a detailed example of a configuration state of a third yoke type MR head of the present invention.
Figure 34:
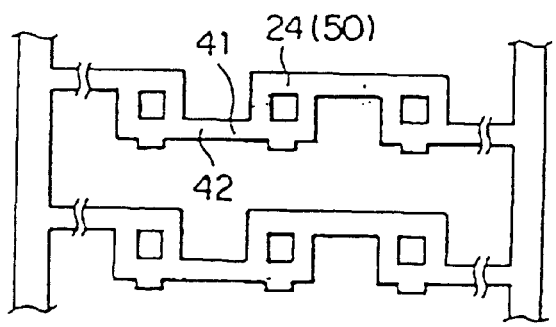
FIG. 34 is a diagram showing another detailed example of a configuration state of a third yoke type MR head of the present invention.
Figure 35:
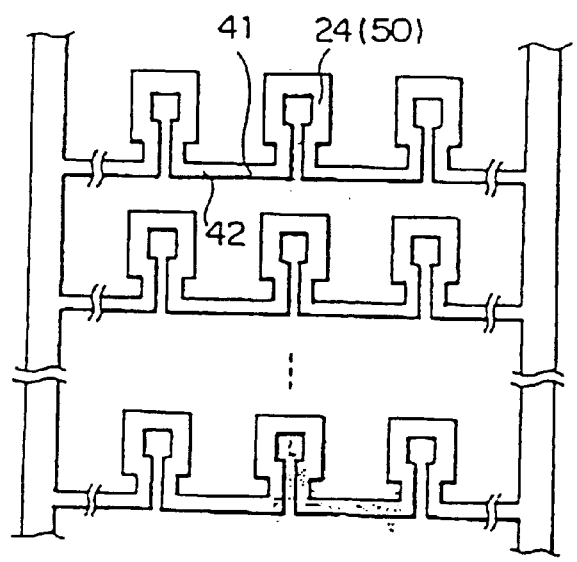
FIG. 35 is a diagram showing a further detailed example of a configuration state of a third yoke type MR head of the present invention.

For instance, in the magnetic layers 24 depicted in FIGS. 15, 16 and 17, a single-element current outflow exit 42 and a current inflow entrance 41 having another element are coupled in series by means of an electric circuit as shown in FIGS. 33, 34 and 35. The non-magnetic metallic layers 54 for supplying a magnetic field induced by electric current as shown in FIGS. 29, 31 and 32 are similarly arranged. According to this configuration, current can be supplied to all the elements on a substrate in a single operation.

The yoke type MR head is obtained by providing an MR film 27 and a pair of leads 28 for supplying current to the MR film 27 after heat processing has been performed to the magnetic yoke 23 and then performing head processing. When spin-valve film is used as the MR film 27, magnetic anneal processing is carried out in addition in order to secure the magnetization.

Detailed examples and evaluations of the yoke type MR head having a magnetic yoke 23 to which a magnetic field on the magnetic yoke induced by electric current has been applied during heat processing as described above will next be described.

EXAMPLE 1

Firstly, yoke type MR heads having the structures described in the following tests 1~4 were created by performing 3 types of heat processing method during the manufacturing process. Of the 3 heat processing methods explained below, heat processing methods (1) and (2) correspond to a method (an embodiment of the present invention) in which heat processing is performed while applying a magnetic field on the magnetic yoke induced by electric current as explained above; method (3) is included as a comparative example. Spin-valve film with the structure: CoFe/Cu/CoFe/IrMn was used here as the MR film.

Test 1

A yoke type MR head having the magnetic yoke 23 shown in FIGS. 15A and 15B (the overall configuration is the same as that depicted in FIG. 6 with the exception that the magnetic gap here consisted of non-magnetic insulating material) was manufactured using laminated film consisting of layers of amorphous CoZrNb (α-Co—Zr—Nb) film and NiFe alloy film as the magnetic layer 24 and $Al_2O_3$ as the magnetic gap 25 and magnetic insulating materials as the high-resistance magnetic material layers 35 between the magnetic layers 24 and the MR film 27.

Test 2

A yoke type MR head with the same structure as in Test 1 was manufactured using NiFe/Cu/NiFe laminated film as the magnetic layer.

Test 3

A yoke type MR head with the same structure as in Test 1 was manufactured using α-Co—Zr—Nb/NiFe/Cu/α-Co—Zr—Nb/NiFe laminated film as the magnetic layer.

Test 4

The yoke type MR head shown in FIG. 28 was manufactured using NiFe/$Al_2O_3$/NiFe laminated film as the magnetic layer 24, non-magnetic metallic Ti as the magnetic gap 25, $Al_2O_3$ as the insulating layer 53, and high conductivity film such as Au, Al, Cu, Ag and the like as the non-magnetic metallic layer 54, and Co—Al—O type granular film as high-resistance magnetic material layers 35. Electric current was supplied to the non-magnetic metallic layer 54 using the configuration shown in FIG. 29.

Heat Processing Conditions (1) At temperature $T_F$, a magnetic field induced by electric current was applied to the MR head (magnetic yoke) by flowing a current from the current inflow entrance to the current outflow exit; after hold this state for a fixed period of time the MR head was cooled to temperature $T_E$ while retaining the magnetic field induced by electric current. After removing the magnetic field at temperature $T_E$, an external magnetic filed of 1~5 kOe was applied in a direction parallel to the surface facing the medium (Y direction/longitudinal direction of the MR film 27) and the MR head was cooled to room temperature whole retaining the external magnetic field.

(2) At temperature $T_A$, a magnetic field induced by electric current was applied to the MR head (magnetic yoke) by flowing a current from the current inflow entrance to the current outflow exit; after hold this state for a fixed period of time the MR head was cooled to temperature $T_E$ while retaining the magnetic field induced by electric current. At temperature $T_E$, an external magnetic filed of 1~5 kOe was supplied in the Y direction while maintaining the flowing current and the MR head was cooled to room temperature while retaining both the magnetic field induced by flowing current and the external magnetic filed by coil.

(3) At temperature $T_A$, an external magnetic field of 1~5 kOe was applied to the MR head in a direction at a right angle to the surface facing the medium (X direction/a direction at a right angle to the Y direction explained above) and held for a fixed period of time before cooling the MR head to temperature $T_E$ while retaining the external magnetic field. At temperature $T_E$, the direction of the applied magnetic field was changed to direction Y and the MR head was then cooled to room temperature while retaining the external magnetic field.

In the above-mentioned heat processing conditions, temperature $T_H$ i the temperature at which direction of magnetic moment of the magnetic yoke can move easily and control easy axis of magnetization. Temperature $T_E$ is the temperature at which easy axis of magnetization of antiferromagnetic layer of the MR film can control easily, while that of magnetic yoke can not control easily.

After the heat processing described above had been carried out, the current inflow entrance, the current outflow exit, the current pass and the like were removed and additional machining and packaging was performed to obtained the respective MR heads.

In addition, the following yoke type MR head was manufactured in a fifth test.

Test 5

First, the ring-shaped magnetic yoke shown in FIGS. 15A and 15B having the structure: anti-ferromagnetic layer/ferromagnetic layer/non-magnetic layer/ferromagnetic layer as shown in FIG. 23 was created. An $Ni_{80}Fe_{20}$ alloy film and an $Ni_{80}Fe_{20}/\alpha$-Co—Zr—Nb laminated film were used respectively as the ferromagnetic layers. Cu was used as the non-magnetic layer and an Ni—Mn alloy was used as the anti-ferromagnetic layer. After forming the micro-pattern of the magnetic yoke, a 10 mA current was fed through the magnetic yoke and this state was maintained for 10 minutes at 723 K in order to induce magnetic anisotropy to the upper and lower ferromagnetic layers of the magnetic yoke. After inducing the magnetic anisotropy by means of a magnetic field induced by electric current in this way, the current supply to the magnetic yoke was suspended to lower the temperature. A plurality of such magnetic yokes were then connected in series as shown in FIG. 35. A spin-valve GMR film was then disposed on the magnetic yoke ad the micro-pattern of the GMR elements was arranged. The yoke type MR head was obtained after annealing in the magnetic field and micro-machining were carried out to secure the magnetization of the GMR film followed by packaging. The overall configuration is the same as that depicted in FIG. 6 with the exception that the magnetic gap here consisted of non-magnetic insulating material.

The playback waveforms of each piece in each of the yoke type MR heads in Tests 1~5 were evaluated and checks were carried out to determine whether noises had occurred. The noise rates for all the tests are shown in Table 1. In Test 4, the resulting playback waveform when the insulating magnetic substance between the magnetic yoke 23 and the MR film 27 is replaced with a high resistance magnetic substance and a portion of the sensing current is shunted to the magnetic yoke 23 during operation of the head was similarly evaluated.

The results obtained in each test reveal that the noise generation rate is lower in all the yoke type MR heads in examples wherein heat processing had been performed with a magnetic field induced by electric current. Furthermore, Test 4 reveals that improved properties are obtained by applied a bias magnetic field during operation of the head.

Figure 41:
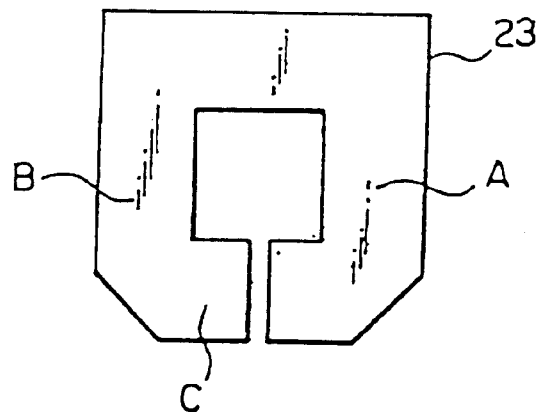
FIG. 41 is a diagram showing observation points of the magnetization direction in a magnetic yoke in an embodiment of the present invention.

Next, a Carr experiment to observe the magnetization directions at designated points was conducted for the comparative example test performed under heat processing condition (3) in Test 1 and for the example tests performed under heat processing conditions (1) and (2). The tests was carried out using test pieces having $10^{18}20$ $\mu$m of square. 3 points $A^{18}$ C on the magnetic yoke were observed for each test as shown in FIG. 41.

Figure 43:
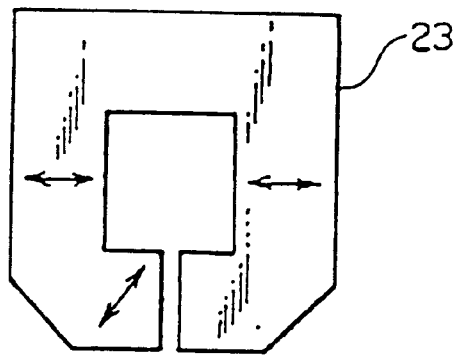
FIG. 43 is a schematic diagram showing observation results of the magnetization direction in a magnetic yoke in a test of an embodiment of the present invention.
Figure 44:
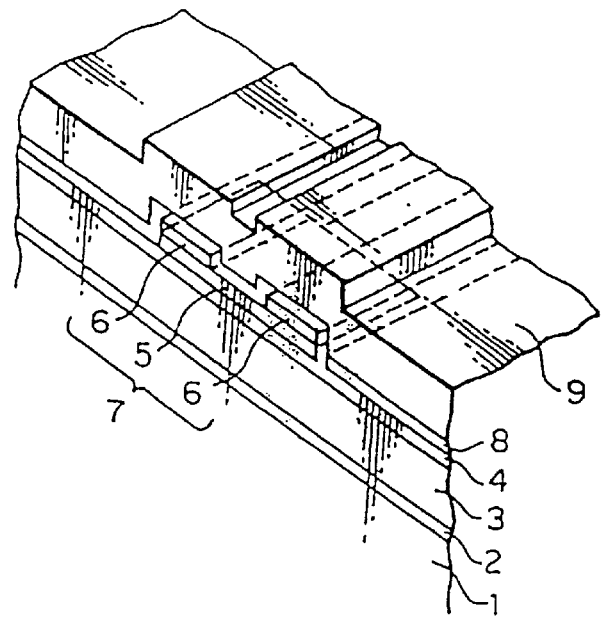
FIG. 44 is a diagonal overview of a general configuration of a conventional shield MR head.
Figure 45:
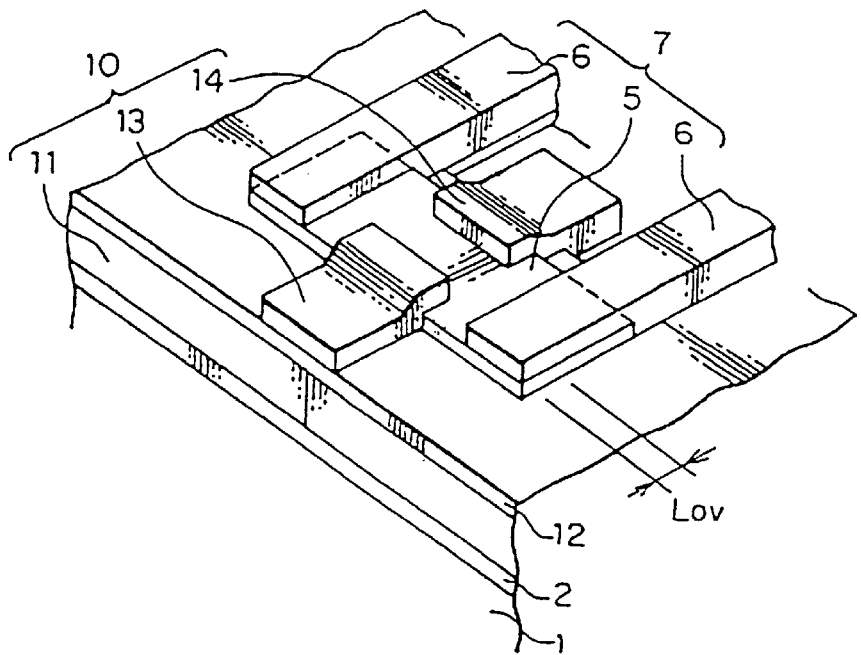
FIG. 45 is a diagonal overview of a general configuration of a conventional yoke type MR head.
Figure 46:
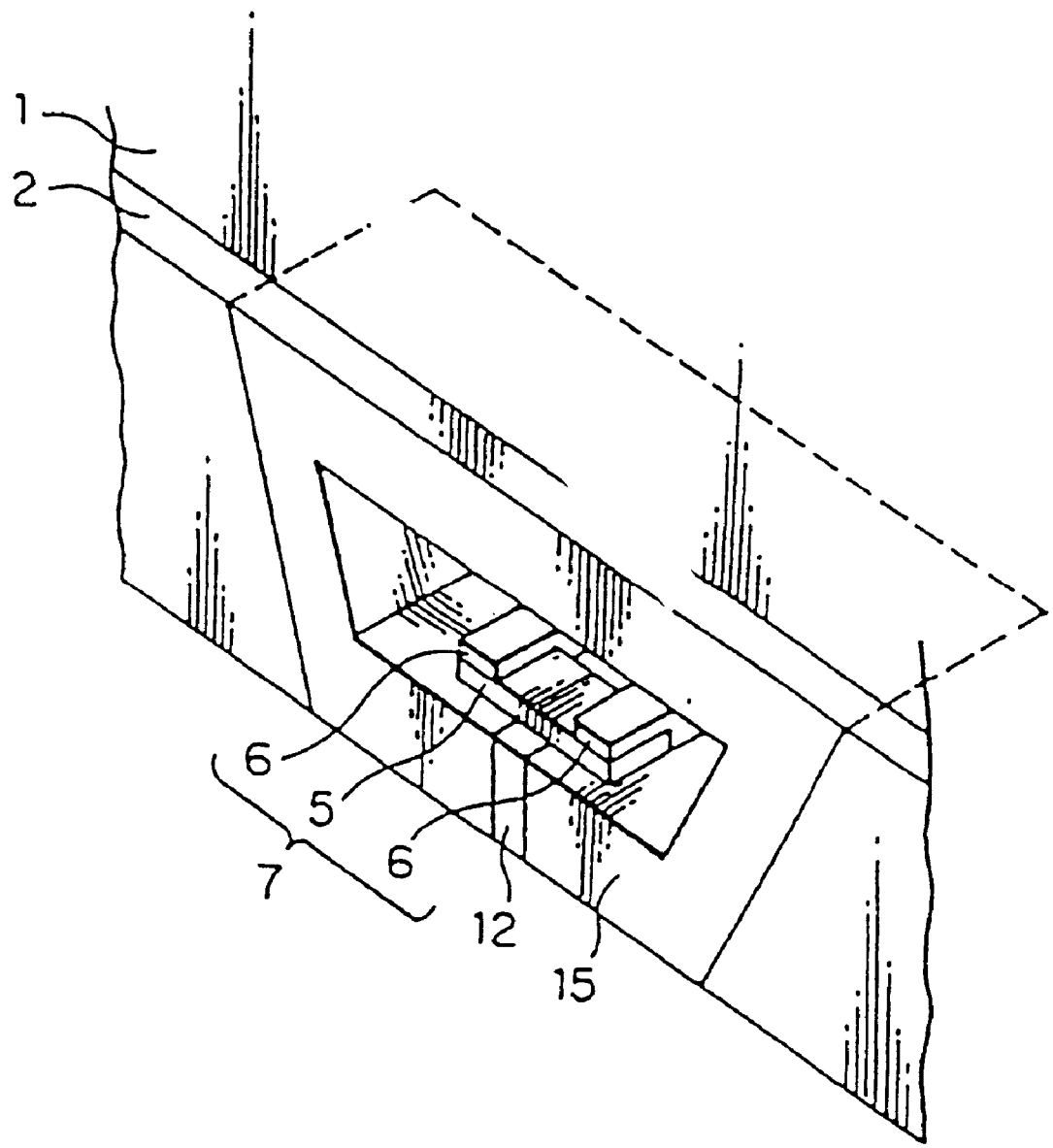
FIG. 46 is a diagonal overview of another conventional yoke type MR head.

In the comparative example test, the magnetization directions of the 3 observation points which are not within the magnetic field are aligned as shown in FIG. 42. In other words, magnetic anisotropy has been induced to points A, B and C in the same direction and the magnetic anisotropy at points A and B is parallel to the magnetic path. By contrast, in the example test in which good playback properties were obtained, the magnetization directions of the 3 observation points which are not within the magnetic field are aligned as shown in FIG. 43. In other words, magnetic anisotropy along the width direction has been induced at points A and B, while magnetic anisotropy in a direction substantially at a right angle to the direction at A and B has been induced at point C. Similar results were obtained in tests $4^{18}5$.

The above experiments reveal that under heat processing conditions (1) and (2) wherein heat processing is performed while applying a magnetic field induced by electric current, Barkhausen noise can be greatly reduced since magnetic anisotropy is induced substantially at a right angle to the magnetic path of the magnetic yoke.

In the following tests $6^{18}13$, magnetic yokes only were manufactured and respective noise generation rates were determined based on the observation of magnetization directions performed in Carr experiments. The tests $11^{18}12$ have only leads so that electric current is supplied to the magnetic yoke. In these experiments, at least two points of magnetization directions which were parallel to the magnetic path at points A~C were regarded as indicating noise generation. The results obtained are also shown in Table 1 and reveal that noise generation rates for the magnetic yokes in tests 6~13 were reduced as a result of performing heat processing with a magnetic field induced by electric current applied.

Test 6

The structure was identical to that in the magnetic yoke of Test 1, with the exception that NiFe alloy film was used as the magnetic layer.

Test 7

The structure was identical to that in the magnetic yoke of Test 1, with the exception that α-Co—Zr—Nb/NiFe/Cu/NiFe laminated film was used as the magnetic layer.

Test 8

The structure was identical to that in the magnetic yoke of Test 1, with the exception that NiFe/Al$_2$O$_3$/NiFe laminated film was used as the magnetic layer.

Test 9

The structure was identical to that in the magnetic yoke of Test 1, with the exception that α-Co—Zr—Nb/Al$_2$O$_3$/α-Co—Zr—Nb/NiFe laminated film was used as the magnetic layer.

Test 10

The structure was identical to that in the magnetic yoke of Test 1, with the exception that α-Co—Zr—Nb/NiFe/Al$_2$O$_3$/NiFe laminated film was used as the magnetic layer.

Test 11

A yoke type MR head with the structure shown in FIG. 28 was manufactured using NiFe alloy film as the magnetic layer 24, a non-magnetic metallic Ti as the magnetic gap 25, Al$_2$O$_3$ as the insulating layer 53, and good conducting film such as Au, Al, Cu, Ag and the like as the non-magnetic metallic layer 54. Electric current was supplied to the non-magnetic metallic layer 54 using the configuration shown in FIG. 29.

Test 12

The structure was identical to that in Test 11, with the exception that laminated film consisting of α-Co—Zr—Nb magnetic film and NiFe alloy film was used as the magnetic layer 24.

Test 13

The yoke type MR head shown in FIG. 30 was manufactured using laminated film consisting a α-Co—Zr—Nb magnetic film and NiFe allow film as the magnetic layer 24, Al$_2$O$_3$ as the magnetic gap 25, al$_2$O$_3$ as the insulating layer 53 and good conducting film such as Au, Al, Cu, Ag and the like as the non-magnetic metallic layer 54. Electric current was supplied to the non-magnetic metallic layer 54 using the configuration shown in FIG. 32.

TABLE 1

| | | Heat Processing Conditions | Noise generation rates* |
|---|---|---|---|
| Test 1 | Comparative Example | (3) External magnetic field (X = 5 kOe, Y = 5 kOe) only | 100 |
| | | (3) External magnetic field (X = 1 kOe, Y = 1 kOe) only | 100 |
| | Embodiment | (1) Magnetic field + external magnetic field (Y = 1 kOe) | 31 |
| | | (2) Magnetic field + external magnetic field (Y = 1 kOe) | 46 |
| | | (2) Magnetic field + external magnetic field (Y = 3 kOe) | 28 |
| Test 2 | Comparative Example | (3) External magnetic field (X = 1 kOe, Y = 1 kOe) only | 92 |
| | Embodiment | (1) Magnetic field + External magnetic field (Y = 1 kOe) only | 50 |
| | | (2) Magnetic field + External magnetic field (Y = 1 kOe) only | 47 |
| Test 3 | Comparative Example | (3) External magnetic field (X = 5 kOe, Y = 5 kOe) only | 92 |
| | Embodiment | (1) Magnetic field + External magnetic field (Y = 1 kOe) only | 27 |

TABLE 1-continued

| | | Heat Processing Conditions | Noise generation rates* |
|---|---|---|---|
| | | (2) Magnetic field + External magnetic field (Y = 1 kOe) only | 31 |
| | | (2) Magnetic field + External magnetic field (Y = 3 kOe) only | 28 |
| Test 4 | Comparative Example | (3) External magnetic field (X = 5 kOe, Y = 5 kOe) only | 100 |
| | Embodiment | (1) Magnetic field + External magnetic field (Y = 1 kOe) only | 41(16) |
| | | (2) Magnetic field + External magnetic field (Y = 2 kOe) only | 53(21) |
| Test 5 | Comparative Example | Magnetic field is not applied | |
| | Embodiment | Anneal while applying a magnetic field | |
| Test 6 | Comparative Example | (3) External magnetic field (X = 5 kOe, Y = 5 kOe) only | 100 |
| | Embodiment | (1) Magnetic field + External magnetic field (Y = 1 kOe) only | 48 |
| | | (2) Magnetic field + External magnetic field (Y = 1 kOe) only | 52 |
| | | (2) Magnetic field + External magnetic field (Y = 3 kOe) only | 44 |
| Test 7 | Comparative Example | (3) External magnetic field (X = 3 kOe, Y = 3 kOe) only | 100 |
| | Embodiment | (1) Magnetic field + External magnetic field (Y = 1 kOe) | 24 |
| | | (2) Magnetic field + External magnetic field (Y = 1 kOe) | 37 |
| Test 8 | Comparative Example | (3) External magnetic field (X = 5 kOe, Y = 5 kOe) only | 100 |
| | Embodiment | (1) Magnetic field + External magnetic field (Y = 1 kOe) | 59 |
| | | (2) Magnetic field + External magnetic field (Y = 3 kOe) | 56 |
| Test 9 | Comparative Example | (3) External magnetic field (X = 3 kOe, Y = 3 kOe) only | 100 |
| | Embodiment | (1) Magnetic field + External magnetic field (Y = 1 kOe) | 54 |
| | | (2) Magnetic field + External magnetic field (Y = 1 kOe) | 59 |
| Test 10 | Comparative Example | (3) External magnetic field (X = 2 kOe, Y = 2 kOe) only | 100 |
| | Embodiment | (1) Magnetic field + External magnetic field (Y = 1 kOe) | 44 |
| | | (2) Magnetic field + External magnetic field (Y = 1 kOe) | 46 |
| Test 11 | Comparative Example | (3) External magnetic field (X = 5 kOe, Y = 5 kOe) only | 100 |
| | Embodiment | (1) Magnetic field + External magnetic field (Y = 1 kOe) | 36(14) |
| | | (2) Magnetic field + External magnetic field (Y = 3 kOe) | 44(18) |
| Test 12 | Comparative Example | (3) External magnetic field (X = 1 kOe, Y = 1 kOe) only | 92 |
| | Embodiment | (1) Magnetic field + External magnetic field (Y = 1 kOe) | 21(8) |
| | | (2) Magnetic field + External magnetic field (Y = 1 kOe) | 46(18) |
| Test 13 | Comparative Example | (3) External magnetic field (X = 5 kOe, Y = 5 kOe) only | 92 |
| | Embodiment | (1) Magnetic field + External magnetic field (Y = 1 kOe) | 48(19) |
| | | (2) Magnetic field + External magnetic field (Y = 1 kOe) | 55(22) |

*( ) is a Noise generation rate when the sensing current is shunted to the magnetic yoke during operation of the head was evaluated.

In the following examples 2~5, magnetic yokes only were manufactured and respective noise generation rates were determined based on the observation of magnetization directions performed in Carr experiments as in tests 6~11 described above.

EXAMPLE 2

A ring-shaped magnetic yoke as depicted in FIGS. 15 A and 15B was disposed on a substrate. The structure of the magnetic yoke consisted of: anti-ferromagnetic layer/ferromagnetic layer/non-magnetic layer/ferromagnetic layer as shown in FIG. 23. $Ni_{80}Fe_{20}$, $Ni_{90}Fe_{10}$ and $Fe_{85}Al_5Si_{10}$ were used respectively as the ferromagnetic layers and the thickness of the ferromagnetic layers was varied within the range 1~500 nm. Cu was used for the non-magnetic layers and the thickness was varied within the range 0.5~100 nm. NiO, Ir—Mn, Ni—Mn and Cr—Mn were used respectively for the anti-ferromagnetic layers and the thickness was varied within the range 2~50 nm. Table 2 describes the structure of the magnetic yoke in detail.

After the micro-pattern of the magnetic yoke was created, a current of 1~50 mA was fed to the magnetic yoke and this state was maintained for 5~30 minutes at the temperature shown in Table 1 (TK) in order to induce magnetic anisotropy to the ferromagentic layers above and below the magnetic yoke. After magnetic anisotropy had been induced by means of a magnetic field induced by electric current, the current supply was suspended to lower the temperature. A plurality of such magnetic yokes were then connected in series as shown in FIG. 35.

EXAMPLE 3

A ring-shaped magnetic yoke as depicted in FIGS. 15A and 15B was disposed in a substrate. The structure of the magnetic yoke consisted of: anti-ferromagnetic layer/ferromagnetic layer/non-magnetic layer/ferromagnetic layer/anti-ferromagnetic layer as shown in FIG. 24. $Ni_{80}Fe_{20}$, $Fe_{85}Al_5Si_{10}$ and Co—Fe—Ni (having lower layers of amorphous Co—Zr—Nb and Ni—Fe) were used respectively as the ferromagnetic layers and the thickness of the ferromagnetic layers was varied within the range 1~500 nm. Cu, Al and Ta were used for the non-magnetic layers and the thickness was varied within the range 0.5~100 nm. Ir—Mn, Ni—Mn, Pd—Mn and Cr—Mn were used respectively for the anti-ferromagnetic layers and the thickness was varied within the range 2~50 nm. The detailed structure of this magnetic yoke is that described in Table 3.

Once the above-mentioned magnetic yoke had been created, heat processing was carried out while applying an electric current as in Example 1 and magnetic anisotropy was induced by means of a magnetic field induced by electric current.

EXAMPLE 4

The ring-shaped magnetic yokes having the structures shown in Table 4 were manufactured by the same method as in the second example. Laminated film in which multi-layer laminated film and anti-ferromagnetic layers were arranged on the inner side was used to form the magnetic yokes in this example.

EXAMPLE 5

The ring-shaped magnetic yoke shaving the structures shown in Table 5 were manufactured by the same method as in the second example. The laminated film functioning as the magnetic yoke was disposed through an insulating film consisting of $Al_2O_3$ on a non-magnetic metallic layer (such as Cu and Al) for applying a magnetic field induced by electric current.

EXAMPLE 6

A ring-shaped magnetic yoke as depicted in FIGS. 15A and 15B was disposed on a substrate. The detailed structure of this magnetic yoke is that described in Table 5. After creating the micro-pattern of the magnetic yoke, a pulse current (10 mA and 50 mA) was fed to the magnetic yoke until the temperature shown in Table 5 was reached in order to induce magnetic anisotropy to the magnetic yoke. As FIG. 35 shows, a plurality of magnetic yokes were connected in series.

COMPARATIVE EXAMPLE

A yoke type MR head having a magnetic yoke consisting of a single-layer film comprising $Ni_{80}Fe_{20}$ and $Fe_{85}Al_5Si_{10}$ was manufactured as a comparative example for the present invention. Heat processing while applying an electric current was not performed to the magnetic field yoke in the comparative example.

The magnetization directions of each of the magnetic yokes in examples 2~6 and the comparative example described above were observed based on Carr experiments as with example 1. At least two points of magnetization directions which were parallel to the magnetic path at points A~C were regarded as indicating noise generation and the rates of noise generated here were evaluated. The results obtained are shown in Tables 2~5. These results reveal that noise generation rates for the magnetic yokes in Examples 2~6 were reduced as a result of performing heat processing with a magnetic field induced by electric current applied.

TABLE 2

Embodiment 2 (Each layer = film thickness: nm)

| $Ni_{80}Fe_{20}$ | Cu | $Ni_{80}Fe_{20}$ | NiO | Tk(K) | I(mA) | Noise generation rate |
|---|---|---|---|---|---|---|
| 1 | 3 | 3 | 25 | 423 | 1 | 1/3. |
| 5 | 3 | 7 | 28 | 423 | 1 | 2/7. |
| 10 | 5 | 30 | 30 | 473 | 2 | 3/10. |
| 70 | 5 | 50 | 50 | 472 | 1 | 3/10. |
| 100 | 10 | 200 | 50 | 473 | 3 | 4/20. |
| 250 | 15 | 250 | 50 | 473 | 5 | 5/20. |
| 250 | 30 | 250 | 50 | 473 | 10 | 3/20. |
| 500 | 50 | 500 | 50 | 473 | 10 | 4/20. |

| $Ni_{80}Fe_{20}$ | Cu | $Ni_{80}Fe_{20}$ | NiMn | Tk(K) | I(mA) | Noise generation rate |
|---|---|---|---|---|---|---|
| 3 | 3 | 5 | 15 | 723 | 1 | 3/10. |
| 10 | 3 | 10 | 15 | 723 | 1 | 3/12. |
| 10 | 5 | 30 | 20 | 723 | 1 | 4/12. |
| 70 | 5 | 50 | 35 | 723 | 1 | 3/12. |
| 100 | 10 | 200 | 50 | 723 | 3 | 3/20. |
| 250 | 15 | 250 | 50 | 723 | 5 | 4/20. |
| 250 | 30 | 250 | 50 | 723 | 10 | 3/20. |
| 500 | 50 | 500 | 50 | 723 | 10 | 3/20. |

| $Ni_{90}Fe_{10}$ | Cu | $Ni_{90}Fe_{10}$ | NiMn | Tk(K) | I(mA) | Noise generation rate |
|---|---|---|---|---|---|---|
| 70 | 5 | 50 | 35 | 723 | 1 | 4/12. |
| 100 | 10 | 200 | 50 | 723 | 3 | 5/20. |
| 250 | 15 | 250 | 50 | 723 | 5 | 3/20. |
| 250 | 30 | 250 | 50 | 723 | 10 | 3/20. |
| 500 | 50 | 500 | 50 | 723 | 10 | 4/20. |

| $Ni_{80}Fe_{20}$ | Cu | $Ni_{80}Fe_{20}$ | IrMn | Tk(K) | I(mA) | Noise generation rate |
|---|---|---|---|---|---|---|
| 3 | 3 | 5 | 10 | 573 | 1 | 4/12. |
| 10 | 3 | 10 | 10 | 573 | 1 | 4/12. |
| 10 | 5 | 30 | 20 | 573 | 1 | 3/12. |
| 70 | 5 | 50 | 25 | 573 | 1 | 4/12. |
| 100 | 10 | 200 | 30 | 573 | 3 | 5/20. |
| 250 | 15 | 250 | 30 | 573 | 5 | 3/20. |
| 250 | 30 | 250 | 30 | 573 | 10 | 4/20. |
| 500 | 50 | 500 | 30 | 573 | 10 | 5/20. |

TABLE 2-continued

Embodiment 2 (Each layer = film thickness: nm)

| FeAlSi | Cu | FeAlSi | CrMn | Tk(K) | I(mA) | Noise generation rate |
|---|---|---|---|---|---|---|
| 3 | 3 | 5 | 15 | 623 | 1 | 3/10. |
| 10 | 3 | 10 | 15 | 623 | 1 | 3/12. |
| 10 | 5 | 30 | 20 | 623 | 1 | 4/12. |
| 70 | 5 | 50 | 35 | 623 | 1 | 3/12. |
| 100 | 10 | 200 | 50 | 623 | 3 | 3/20. |
| 250 | 15 | 250 | 50 | 623 | 5 | 4/20. |
| 250 | 30 | 250 | 50 | 623 | 10 | 3/20. |
| 500 | 50 | 500 | 50 | 623 | 10 | 3/20. |

TABLE 3

Embodiment 3

| Anti-ferro-magnetic layer | Ferro-magnetic layer | Non-ferro-magnetic layer | Ferro-magnetic layer 2 | Anti-ferro-magnetic layer 2 | Tk(K) | I(mA) | Noise generation rate |
|---|---|---|---|---|---|---|---|
| IrMn(4) | $Ni_{80}Fe_{20}(5)$ | Cu(5) | $Ni_{80}Fe_{20}(5)$ | IrMn(5) | 553 | 1 | 34% |
| IrMn(5) | $Ni_{80}Fe_{20}(20)$ | Cu(5) | $Ni_{80}Fe_{20}(20)$ | IrMn(5) | 573 | 3 | 26% |
| IrMn(5) | $Ni_{80}Fe_{20}(80)$ | Cu(5) | $Ni_{80}Fe_{20}(50)$ | IrMn(5) | 573 | 3 | 30% |
| IrMn(7) | $Ni_{80}Fe_{20}(200)$ | Cu(10) | $Ni_{80}Fe_{20}(200)$ | IrMn(7) | 573 | 5 | 22% |
| NiMn(15) | $Ni_{80}Fe_{20}(200)$ | Al(10) | $Ni_{80}Fe_{20}(200)$ | NiMn(15) | 723 | 5 | 18% |
| IrMn(7) | $Ni_{80}Fe_{20}(300)$ | Cu(30) | $Ni_{80}Fe_{20}(500)$ | IrMn(7) | 573 | 10 | 25% |
| IrMn(7) | $Ni_{80}Fe_{20}(300)$ | Ta(50) | $Ni_{80}Fe_{20}(500)$ | IrMn(7) | 573 | 10 | 28% |
| NiMn(15) | $Ni_{80}Fe_{20}(300)$ | Cu(30) | $Ni_{80}Fe_{20}(300)$ | NiMn(15) | 723 | 10 | 25% |
| PdMn(10) | $Ni_{80}Fe_{20}(300)$ | Cu(30) | $Ni_{80}Fe_{20}(300)$ | PdMn(10) | 623 | 10 | 22% |
| NiMn(15) | CoFeNi(250)/$Ni_{80}Fe_{20}(5)$ | Cu(30) | CoFeNi(250)/$Ni_{80}Fe_{20}(5)$ | NiMn(15) | 723 | 10 | 34% |
| NiMn(15) | FeAlSi(200) | Cu(30) | FeAlSi(200) | NiMn(15) | 723 | 10 | 25% |
| NiMn(15) | FeAlSi(300) | Al(30) | FeAlSi(300) | NiMn(15) | 723 | 10 | 33% |
| CrMn(15) | FeAlSi(400) | Ta(50) | FeAlSi(500) | CrMn(15) | 673 | 10 | 28% |

Film thickness (nm)

TABLE 4

Embodiment 4

| Structure of the magnetic yoke (nm) | Tk(K) | I(mA) | Noise generation rate |
|---|---|---|---|
| NiMn(15)/$Ni_{80}Fe_{20}(120)$/Cu(20)/$Ni_{80}Fe_{20}(120)$/$Al_2O_3(20)$/$Ni_{80}Fe_{20}(120)$/NiMn(15) | 723 | 10 | 22% |
| IrMn(5)/$Ni_{80}Fe_{20}(50)$/Cu(10)/$Ni_{80}Fe_{20}(50)$/$Al_2O_3(20)$/$Ni_{80}Fe_{20}(50)$/IrMn(5) | 573 | 10 | 18% |
| IrMn(8)/$Ni_{80}Fe_{20}(150)$/Cu(3)/$Ni_{80}Fe_{20}(150)$/$Al_2O_3(20)$/$Ni_{80}Fe_{20}(150)$/IrMn(8) | 573 | 10 | 33% |
| PdMn(15)/Hf(1)/$Ni_{30}Fe_{20}(150)$/Cu(30)/$Ni_{80}Fe_{20}(150)$/$Al_2O_3(20)$/$Ni_{80}Fe_{20}(150)$/PdMn(15) | 623 | 10 | 30% |
| NiMn(20)/Cr(1)/FeAlSi(120)/Cu(30)/FeAlSi(120)/$Al_2O_3(20)$/FeAlSi(120)/Cu(1)/NiMn(20) | 723 | 10 | 25% |
| IrMn(8)/$Ni_{80}Fe_{20}(150)$/$Al_2O_3(10)$/$Ni_{80}Fe_{20}(200)$/$Al_2O_3(10)$/$Ni_{80}Fe_{20}(150)$/IrMn(8) | 573 | 10 | 20% |
| NiMn(20)/$Ni_{80}Fe_{20}(150)$/Cu(10)/$Ni_{80}Fe_{20}(80)$/$Al_2O_3(20)$/$Ni_{80}Fe_{20}(80)$/Cu(10)/$Ni_{80}Fe_{20}(150)$/NiMn(15) | 723 | 10 | 28% |
| $Ni_{80}Fe_{20}(50)$/Cu(3)/NiMn(20)/$Ni_{80}Fe_{20}(100)$ | 723 | 1 | 19% |
| $Ni_{80}Fe_{20}(100)$/Cu(10)/IrMn(8)/$Ni_{80}Fe_{20}(1200)$ | 573 | 5 | 25% |
| $Ni_{80}Fe_{20}(100)$/Al(8)/$Ni_{80}Fe_{20}(100)$/Al(8)/NiMn(15)/$Ni_{80}Fe_{20}(100)$ | 723 | 10 | 16% |
| NiO(30)/$Ni_{80}Fe_{20}(100)$/Cu(10)/$Ni_{80}Fe_{20}(100)$/Cu(10)/NiO(50)/$Ni_{80}Fe_{20}(100)$ | 473 | 10 | 33% |
| PdMn(15)/$Ni_{80}Fe_{20}(100)$/Cu(10)/$Ni_{80}Fe_{20}(100)Al_2O_3(20)$/$Ni_{80}Fe_{20}(100)$/Cu(10)/$Ni_{80}Fe_{20}(100)$/PdMn(15) | 623 | 10 | 22% |

Film thickness (nm)

TABLE 5

| Structure of the magnetic yoke (nm) | Tk(K) | I(mA) | Noise generation rate |
|---|---|---|---|
| Embodiment 5 | | | |
| Cu(10)/Al$_2$O$_3$(20)/Ni$_{80}$Fe$_{20}$(50)/Al$_2$O$_3$(2)/Ni$_{80}$Fe$_{20}$(50)/Al$_2$O$_3$(2)/Ni$_{80}$Fe$_{20}$(50)/IrMn(8) | 573 | 10 | 15% |
| Cu(30)/Al$_2$O$_3$(40)/IrMn(10)/[Ni$_{80}$Fe$_{20}$(50)/Al$_2$O$_3$(2)]$_4$/Ni$_{80}$Fe$_{20}$(50) | 573 | 30 | 25% |
| Al(30)/Al$_2$O$_3$(20)/NiO(50)/[Ni$_{80}$Fe$_{20}$(20)/Al$_2$O$_3$(2)]$_6$/Ni$_{80}$Fe$_{20}$(20)/NiO(50) | 493 | 10 | 33% |
| Cu(30)/Al$_2$O$_3$(20)/NiMn(15)/[Ni$_{80}$Fe$_{20}$(50)/Al$_2$O$_3$(5)]$_4$/Ni$_{80}$Fe$_{20}$(50) | 723 | 10 | 20% |
| Cu(30)/Al$_2$O$_3$(20)/NiMn(15)/Ni$_{80}$Fe$_{20}$(200)/Al$_2$O$_3$(5)/Ni$_{80}$Fe$_{20}$(200) | 723 | 30 | 28% |
| Cu(30)/Al$_2$O$_3$(20)/NiMn(15)/CoZrNb(10)/Ni$_{80}$Fe$_{20}$(10)/CoFeNi(7)/Al$_2$O$_3$(5)/CoZrNb(10)/Ni$_{80}$Fe$_{20}$(10)/CoFeNi(7)/Cu(1)/NiMn(15) | 723 | 10 | 33% |
| Cu(30)/SiO$_x$(40)/FeAlSi(20)/CrMn(20)/[FeAlSi(20)/SiO$_x$(3)]2/FeAlSi(20) | 723 | 50 | 16% |
| Embodiment 6 | | | |
| IrMn(7)/Ni$_{80}$Fe$_{20}$(250)/Cu(10)/Ni$_{80}$Fe$_{20}$(250)/IrMn(7) | 473 | 10 | 15% |
| NiMn(12)/Ni$_{80}$Fe$_{20}$(100)/Cu(10)/NiMn(12)/Ni$_{80}$Fe$_{20}$(100) | 573 | 50 | 12% |
| Comparative Example | | | |
| Ni$_{80}$Fe$_{20}$(300) | — | — | 88% |
| Ni$_{80}$Fe$_{20}$(500) | — | — | 72% |
| Ni$_{80}$Fe$_{20}$(1000) | — | — | 74% |
| Fe$_{85}$Al$_5$Si$_{10}$(500) | — | — | 92% |
| Fe$_{85}$Al$_5$Si$_{10}$(1000) | — | — | 82% |

Film thickness (nm)

A second embodiment of a yoke type MR head implementing a second magnetoresistance head of the present invention will next be explained with reference to FIGS. 36 and 37.

Figure 36:
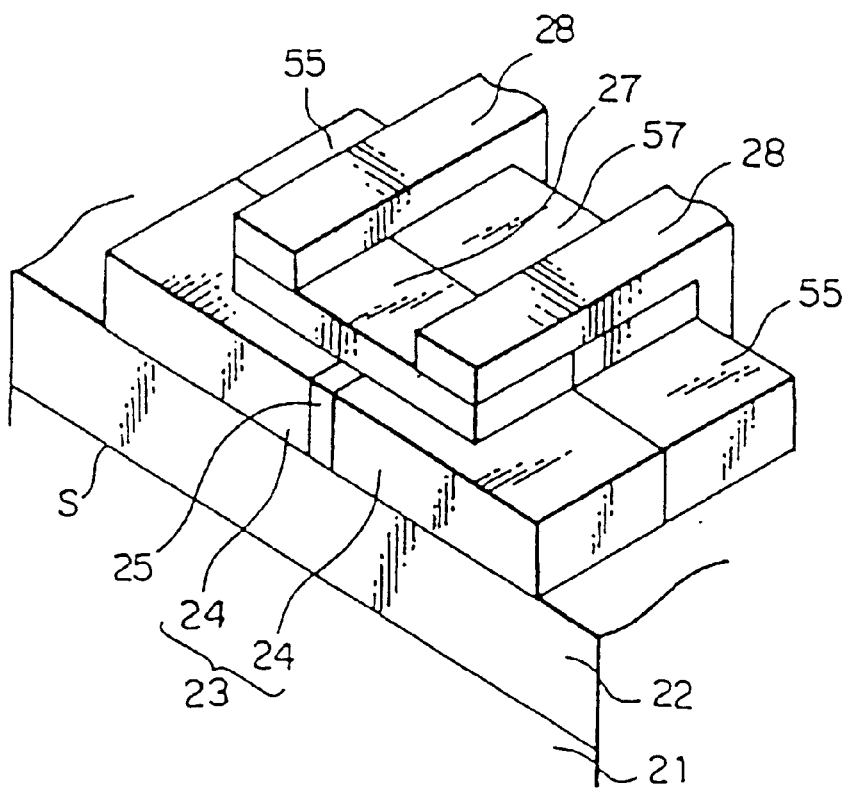
FIG. 36 is a diagonal overview of a general configuration of a second embodiment of a second yoke type MR head of the present invention.
Figure 37:
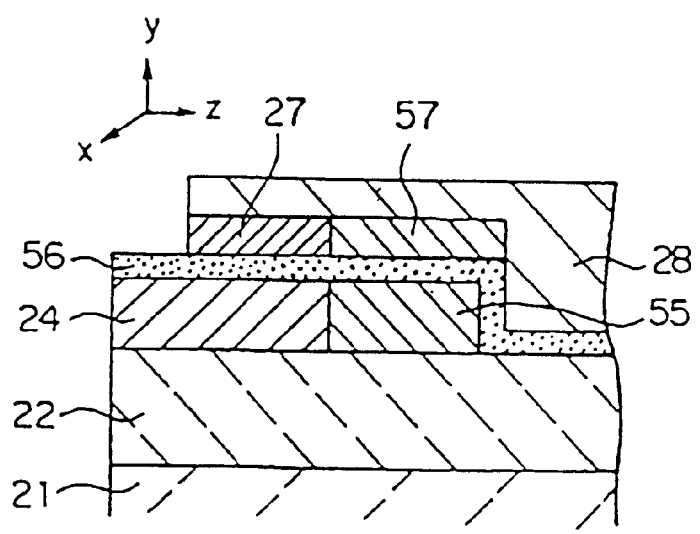
FIG. 37 is a cross-sectional view of the yoke type MR head shown in FIG. 36.

FIGS. 36 and 37 show a configuration of a yoke type MR head according to the present embodiment. FIG. 36 is a diagonal overview from the direction of the side facing the medium and FIG. 37 is a cross-sectional view. The yoke type MR head shown in these diagrams comprises a magnetic yoke 23 consisting of a pair of magnetic layers 24 disposed on a Al$_2$O$_3$ substrate 21 having an insulating lower layer 22.

The pair of magnetic layers 24 forming the magnetic yoke 23 are arranged facing each other over a magnetic gap 25. The pair of magnetic layers 24 are arranged side by side on the substrate and have plane surfaces substantially parallel to the substrate surface. The pair of magnetic layers 24 forming the magnetic yokes 23 and the magnetic gap 25 are arranged in parallel to the surface of the substrate. The magnetic yoke 23 and the magnetic gap 25 consist of the same materials as described in the first embodiment.

Hard magnetic layers 55 for applying bias magnetic field (magnetic bias) to the magnetic yoke 23 are arranged on the rear sides of the two magnetic layers 24 which form the magnetic yoke 23, i.e. at a position back from the surface S facing the medium. The hard magnetic layer 55 comprises CoPt allot film or the like. The magnetic bias applied by this hard magnetic layer 55 controls the magnetic domains of the magnetic yoke 23.

The MR film 27 is disposed above the magnetic yoke 23 substantially parallel to the magnetic path of the magnetic yoke 23 and at a predetermined distance back from the surface S facing the medium. An insulating layer 56 (not depicted in FIG. 36) is provided between the MR film 27 and the pair of magnetic layers 24 substantially parallel thereto. An insulating layer 56 is also provided for insulating the area between the magnetic layers 24 and the MR film 27 in the other embodiments explained below. The MR film 27 is magnetically coupled to both of the two magnetic layers 24 across the magnetic gap 25 and the longitudinal direction of the MR film 27 is substantially parallel to the direction of the signal magnetic filed led in by the magnetic path of the magnetic yoke 23.

A hard magnetic layer 57 for applying bias magnetic field (magnetic bias) to the MR film 27 is disposed on the rear side of the MR film 27, i.e. at a position back from the surface S facing the medium. The hard magnetic layer 57 is formed from CoPt alloy film or the like, as was the hard magnetic layer 55 for applying magnetic bias to the magnetic yoke 23 described above. The magnetic bias applied by this hard magnetic layer 57 controls the magnetic domains of the magnetic yoke 27.

A pair of leads 28 consisting of Cu or such like are provided on the MR film 27 and are electrically connected to both ends thereof. These two leads 28 are arranged so that sensing current flows along the length of the MR film 27 substantially parallel to the magnetic path of the magnetic yoke 23. The MR film 27 should preferably be covered with a magnetic shield layer supported by insulating film in order to prevent noise being generated by distribution magnetic fields.

In a yoke type MR head with the above configuration, the generation of magnetic domains in the magnetic yoke 23 and the MR film 27 can be controlled by means of the bias magnetic field (magnetic bias) applied to the magnetic yoke 23 and the MR film 27 by the hard magnetic layers 55 and 57. Consequently, excellent linear responsivity can be obtained. In particular, noise caused by Barkhausen jumps in the magnetic yoke 23 can be reduced.

Furthermore, the MR film 27 can be precisely disposed at a minimum distance back from the surface S facing the medium. In other words, the MR film 27 is precisely disposed in a position proximate to the surface S facing the medium, thereby enabling a large number of signal magnetic fields to be led to the MR film 27. It is consequently possible to avoid any reduction in output which was one of the disadvantages of a conventional yoke type MR head. Moreover, the amount of overlap between the MR film 27 and the pair of magnetic layers 24 forming the magnetic yoke 23 can be set irrespective of the distance of the MR film 27 from the surface S facing the medium. It is therefore possible to reduce variation in playback output. The resultant effects will next be explained quantitatively.

When the pair of magnetic layers 24 (thickness: $t_1$, $t_2$; magnetic permeability: $\mu_1$, $\mu_2$) facing each other over the magnetic gap 25 (width:g) draw in a magnetic flux from the medium, the magnetic flux density through the magnetic substance deteriorates as the distance form the surface facing the medium increases. The distance $\lambda$ at which the magnetic flux density through the magnetic substance deteriorates by 1/e from the value at the tip of the magnetic substance is termed "property length" and is obtained by the following equation:

$$1/\lambda\tilde{\ }(1\ g/\mu_1 t_1 + 1/g\ \mu_2 t_2)^{0.5}$$

For instance, when recording density is 1 Gb/inch$^2$, for the yoke type MR head shown in FIG. 36 the values are around: g=0.25 μm, $t_1$=t=2 μm, $\mu_1$=$\mu_2$=1000. This gives a property length $\lambda$ of roughly 16 μm. Therefore, with the above-mentioned MR head, approximately 90% of the magnetic flux flowing to the head can be led to the MR film 27 even of the MR film 27 is positioned at 1.0 μm back from the surface S facing the medium. Therefore, there is basically no reduction is output. In a case in which the head has suffered abrasion of roughly 0.5 μm, magnetic flux flowing to the head would increase by only 5%. Fluctuations in output can therefore be largely ignored. Variation in playback output is also negligible, since the amount of overlap between the MR film 27 and the pair of magnetic layers 24 forming the magnetic yoke 23 can be set at a sufficiently large amount irrespective of the distance of the MR film 27 from the surface S facing the medium.

Alternatively, the MR film 27 can be deemed as a single magnetic domain to eliminate Barkhausen noise by adding a bias layer to the MR film 27 instead of the hard magnetic layer 57. A hard magnetic film such as CoPt (film which is more magnetically retentive and has greater magnetic anisotropy than MR film 27 [a magnetic free layer in the case of spin-valve film for instance]) or an anti-ferromagnetic film consisting of IrMn and the like is used as the bias layer. Explained in more detail, when spin-valve film formed form laminated film comprising a first anti-ferromagnetic bias layer (such as IrMn, NiMn)/a magnetic pin layer (such as CoFe, Co, NiFeCo, NiFe)/a non-magnetic layer (such as Cu)/a magnetic free layer (such as CoFe, Co, NiFeCo, NiFe) is used, a second bias film is added adjacent to the magnetic free layer. This second bias film applys a bias magnetic field for deeming the magnetic free layer as a single magnetic domain in a direction differing by 90° from the first anti-ferromagnetic bias layer disposed adjacent to the magnetic pin layer (i.e. in the signal flux propagation direction [direction z in FIG. 37]). Since sensitivity is reduced when the bias magnetic field applied by the second bias film is too strong, the bias magnetic field can be weakened by inserting a bias magnetic field adjusting layer (a non-magnetic layer consisting of Cu and anneal and the like, or a magnetic layer consisting of NiFeNb and the like having low saturated magnetization) between the second bias film and the magnetic free layer.

Furthermore, a magnetic field induced by an MR film 27 sensing current may be used instead of the hard magnetic layer 57. For instance, when using a spin-valve film as the MR film 27, a soft magnetic film any be added to the magnetic free layer with an electric insulating layer in between. Consequently, the sensing current does not flow to this soft magnetic film. The magnetic free layer and the soft magnetic film are machined to identical micro-shapes. With this configuration, the magnetic field induced form the sensing current fed in the x direction in FIG. 37 magnetizes the soft magnetic film in the z direction. As a result, a still magnetic field from the soft magnetic film can be added to the magnetic free layer in a direction differing by 180° from the magnetization direction of the soft magnetic film (i.e. if the magnetization of the soft magnetic film is in the plus z direction, a still magnetic field is added in the minus z direction), the magnetic free layer becomes a single magnetic domain in the z direction and Barkhausen noise can be eliminated. A soft magnetic film may also be added to the anti-ferromagnetic layer of the spin-valve film with an insulating lye in between.

Another example using a sensing magnetic field induced by electric current is shown below. The spin-valve film used here is formed from laminated film consisting of a magnetic free layer/a non-magnetic layer/a magnetic pin layer/an anti-ferromagnetic layer/a magnetic pin layer/a non-magnetic layer/a magnetic free layer. The sensing current fed through this spin-valve film magnetizes the upper and lower magnetic free layers in the minus z direction and the plus z direction respectively. Since this configuration enables the still magnetic field to be used also, a more stable magnetic domain can be obtained than when just one magnetic free layer is allocated as a single magnetic domain using a magnetic field induced by electric current.

Figure 38:
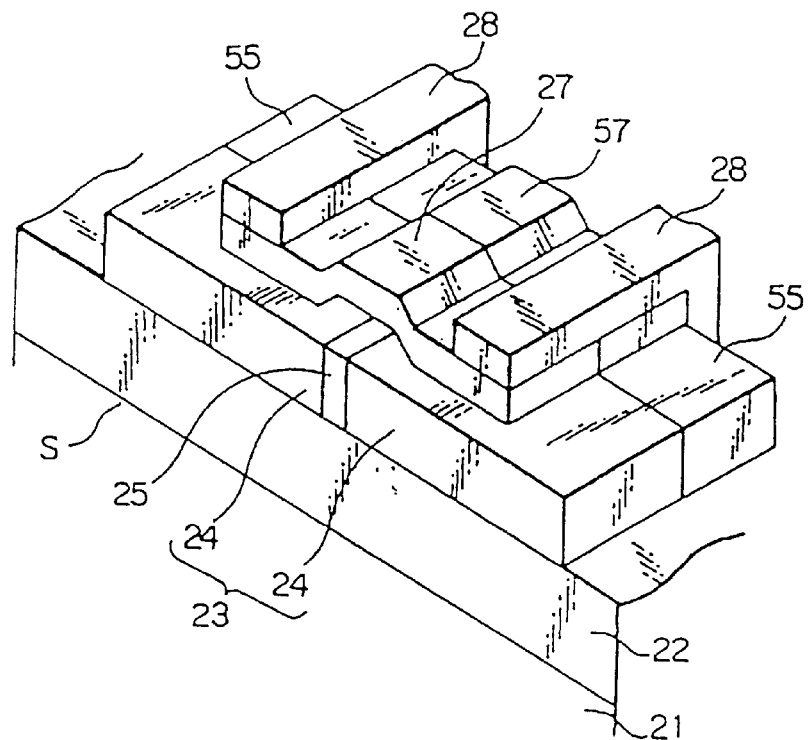
FIG. 38 is a diagonal overview of a modified example of the yoke type MR head shown in FIG. 36.

In a yoke type MR head in the embodiment described above, most of the MR film 27 can be saturated by using a small magnetic field since such a large amount of magnetic flux flows to the MR film 27. However, the unwelcome problem arises that the change in the resistance may be saturated too rapidly. This can be solved by bending the central portion of the MR film 27 upwards to increase the space between the MR film 27 and the magnetic yoke 23 as shown for instance in FIG. 38, thereby making it possible to curb saturation of resistance change.

Figure 39:
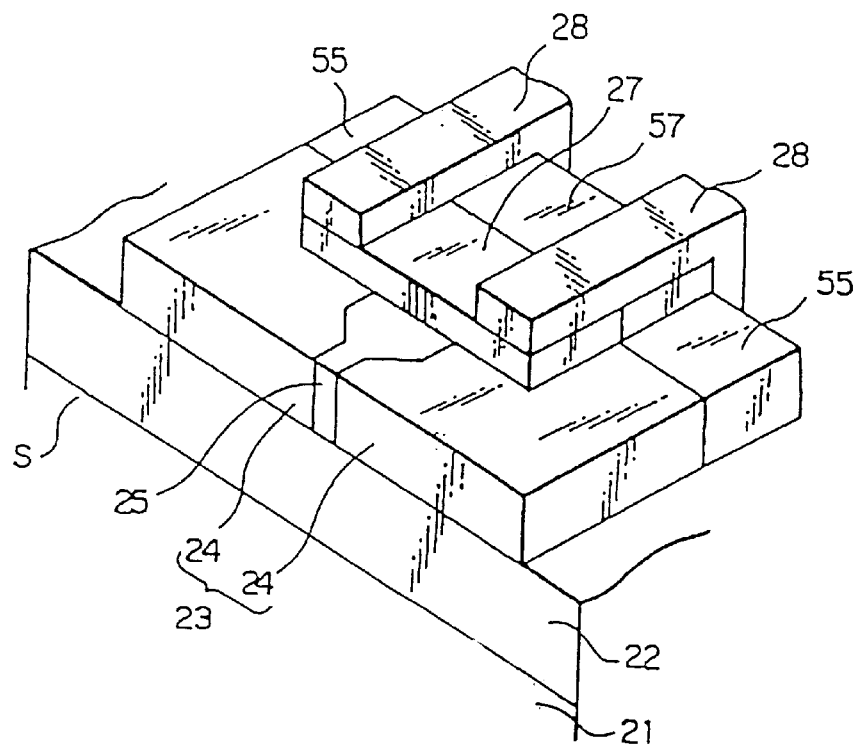
FIG. 39 is a diagonal overview of another modified example of the yoke type MR head shown in FIG. 36.

As FIG. 39 shows, it is also effective to set a wide space between the 2 magnetic layers 24 upon which the MR film 27 is disposed, while retaining a narrow gap on the side facing the medium which forms the magnetic gap 25. The resistance of the MR film 27 is a yoke type MR head with this configuration can be set at a high value. Widening the distance between the pair of magnetic layers 24 to around 0.5~9 μm while retaining a narrow gap (e.g. 0.05~0.2 μm) on the side facing the medium also helps to increase the size of the portion not saturated by the magnetic field. Saturation of resistance change can therefore be curbed and a highly linear MR head can be provided.

Figure 40:
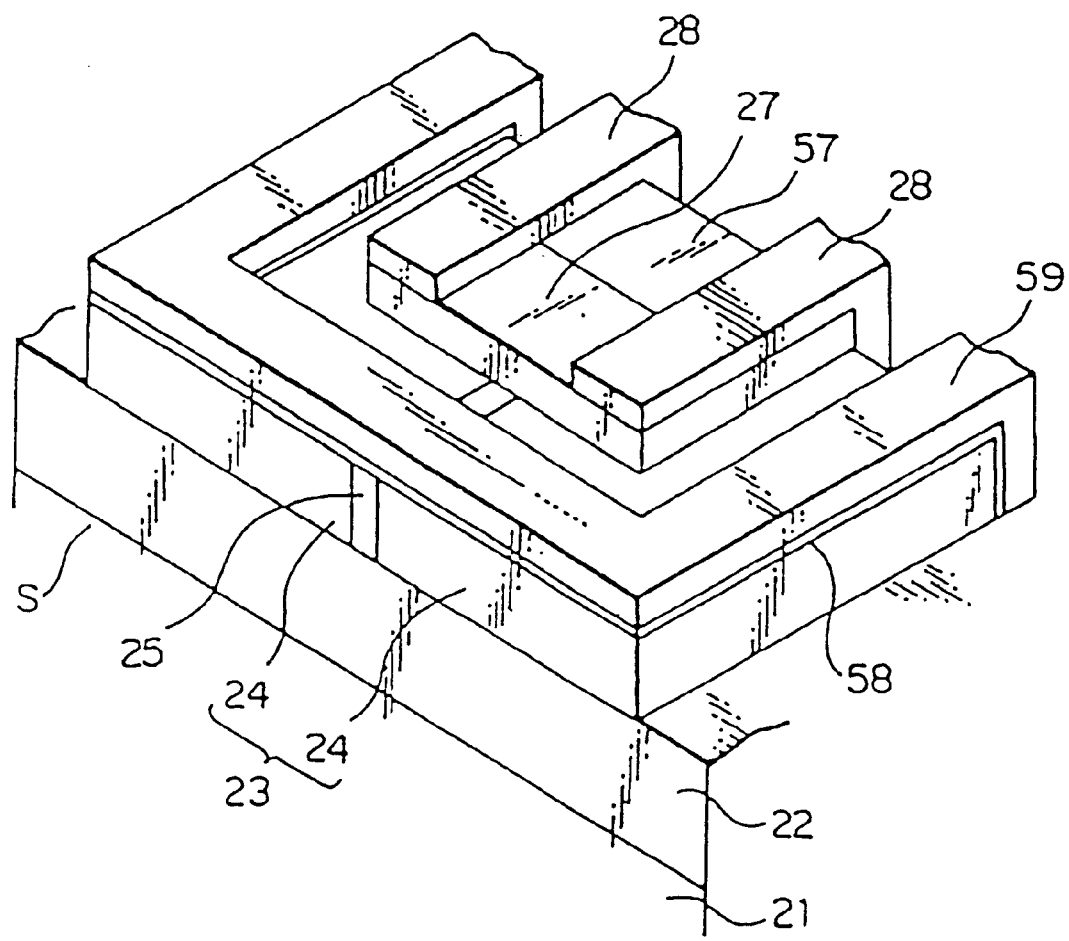
FIG. 40 is a diagonal overview of a general configuration of another embodiment of a second yoke type MR head of the present invention.

In the above embodiment, bias magnetic fields were applied to the magnetic yoke 23 and the MR film 27 by means of hard magnetic layers 55 and 57, but it is also possible to combine a hard magnetic layer bias magnetic field with a bias magnetic field applied using a magnetic field induced by electric current as explained in the first embodiment. In this case, a hard magnetic layer 57 is provided on the rear portion of the MR film 27 as shown in FIG. 40. A wore layer 59 consisting of Cu or such like is provided on the pair of magnetic layers 24 forming the magnetic yoke 23 with an insulating layer 58 consisting of $Al_2O_3$ or the like provided in between. The wire layer 59 may preferably be positioned some distance back from the surface S facing the medium in view of the degree of contact with the recording medium.

A bias magnetic field applied by a magnetic field induced by electric current is applied to the magnetic yoke 23 by passing an electric current through the wire layer 59 on the magnetic layers 24. A bias magnetic field applied by the hard magnetic layer 57 is applied to the MR film 27. According to this configuration, excellent linear responsivity can be obtained and Barkhausen noise can be reduced.

As the embodiments described above clearly show, deterioration of magnetoresistance film properties or reduction in yield accompanying formation of the leads and such like can be prevented according to a first magnetoresistance head of the present invention. MR film sensitivity can also be improved. Furthermore, the manufacturing processes of the magnetic yoke and leads and the like can be simplified thereby reducing costs. Consequently, a yoke type MR head having excellent and reliable properties can be provided at low cost and with a high yield. In addition, a yoke type MR head having excellent and reliable properties can be provided at low cost and with a high yield according to second and third magnetoresistance heads of the present invention.

While there have been described what are at present considered to be preferred embodiments of the invention, it will be understood that various modifications may be made thereto, and it is intended that the claims cover all such modifications as fall within the true spirit and scope of the invention.

What is claimed is:

1. A method of manufacturing a magnetoresistance head, comprising:

forming a magnetic yoke on a substrate, the magnetic yoke having a first magnetic portion, a second magnetic portion and a magnetic gap formed of a non-magnetic material provided between the first and second magnetic portions in a side of a surface facing a medium;

electrically connecting the first magnetic portion and the second magnetic portion opposite to the first magnetic portion through the magnetic gap.

2. The method according to claim 1, wherein the step of inducing magnetic anisotropy is performed by annealing the magnetic yoke in a magnetic field induced by flowing an electric current through the magnetic yoke.

3. The method according to claim 1, wherein the step of inducing magnetic anisotropy is performed by annealing the magnetic yoke in a magnetic field induced by flowing an electric current through an electric circuit adjacent to the magnetic yoke.

4. A magnetoresistance head manufacturing method according to claim 2, wherein the electric current is flowing in series for multiple magnetic yokes on the substrate, and the electric current is supplied to the multiple magnetic yokes in series during the annealing.

5. A method of manufacturing a magnetoresistance head, comprising:

forming a magnetic yoke in a substrate;

inducing magnetic anisotropy in the yoke by annealing the magnetic yoke in a magnetic field induced by flowing an electric current through the magnetic yoke, wherein a direction of the magnetic anisotropy of a point on the magnetic yoke is substantially perpendicular to a magnetic path of the magnetic yoke at this point;

forming a magnetoresistance film on the magnetic yoke; and forming a pair of leads of supplying a sensing current to the magnetoresistance film.

6. A magnetoresistance head manufacturing method according to claim 5, wherein the electric current is flowing in series for multiple magnetic yokes on the substrate.

7. A method of manufacturing a magnetoresistance head, comprising:

forming a magnetic yoke on a substrate;

incurring magnetic anisotropy in the yoke by annealing the magnetic yoke in a magnetic field induced by flowing an electric current through an electric circuit adjacent to the magnetic yoke, wherein a direction of the magnetic anisotropy of a point on the magnetic yoke is substantially perpendicular to a magnetic path of the magnetic yoke at the point;

forming a magnetoresistance film on the magnetic yoke; and forming a pair of leads of supplying a sensing current to the magnetoresistance film.

\* \* \* \* \*

UNITED STATES PATENT AND TRADEMARK OFFICE
CERTIFICATE OF CORRECTION

PATENT NO. : 6,256,863 B1
DATED : July 10, 2001
INVENTOR(S) : Saito et al.

It is certified that error appears in the above-identified patent and that said Letters Patent is hereby corrected as shown below:

<u>Title page,</u>
Item [75], Inventors:, change "Masahi" to -- Masashi --.

<u>Column 33,</u>
Line 30, change "portion through the magnetic gap." to
-- portion through the magnetic gap;

inducing magnetic anisotropy in the yoke, wherein a direction of the magnetic anisotropy of a point on the magnetic yoke is substantially perpendicular to a magnetic path of the magnetic yoke at the point;

forming a magnetoresistance film and a pair of leads for supplying sensing current; and electrically separating the first magnetic portion and the second magnetic portion opposite to the first magnetic portion through the magnetic gap. --

Signed and Sealed this

Twenty-fifth Day of June, 2002

Attest:

JAMES E. ROGAN
Attesting Officer      Director of the United States Patent and Trademark Office